United States Patent
Lam et al.

(10) Patent No.: US 9,401,508 B2
(45) Date of Patent: Jul. 26, 2016

(54) ELECTRICAL STORAGE DEVICE AND ELECTRODE THEREOF

(75) Inventors: Lan Trieu Lam, Springvale (AU); Rosalle Louey, Donvale (AU); David Vella, Sunshine West (AU)

(73) Assignee: COMMONWEALTH SCIENTIFIC AND INDUSTRIAL RESEARCH ORGANISATION, Campbell (AU)

(*) Notice: Subject to any disclaimer, the term of this patent is extended or adjusted under 35 U.S.C. 154(b) by 580 days.

(21) Appl. No.: 13/392,774

(22) PCT Filed: Aug. 27, 2010

(86) PCT No.: PCT/AU2010/001113
§ 371 (c)(1),
(2), (4) Date: Jun. 6, 2012

(87) PCT Pub. No.: WO2011/029130
PCT Pub. Date: Mar. 17, 2011

(65) Prior Publication Data
US 2012/0244429 A1 Sep. 27, 2012

Related U.S. Application Data

(60) Provisional application No. 61/344,020, filed on May 7, 2010, provisional application No. 61/344,179, filed on Jun. 4, 2010.

(30) Foreign Application Priority Data

| Aug. 27, 2009 | (JP) | 2009-196200 |
| Jan. 19, 2010 | (AU) | 2010900189 |
| Mar. 26, 2010 | (AU) | 2010901283 |

(51) Int. Cl.
*H01M 4/64* (2006.01)
*H01M 4/04* (2006.01)
(Continued)

(52) U.S. Cl.
CPC .............. *H01M 4/14* (2013.01); *H01G 11/26* (2013.01); *H01G 11/28* (2013.01); *H01G 11/30* (2013.01);
(Continued)

(58) Field of Classification Search
None
See application file for complete search history.

(56) References Cited

U.S. PATENT DOCUMENTS

| 2,938,063 A | 5/1960 | Greenburg et al. |
| 3,881,954 A | 5/1975 | Maskalick |

(Continued)

FOREIGN PATENT DOCUMENTS

| CN | 1357899 | 7/2002 |
| CN | 101079510 | 11/2007 |

(Continued)

OTHER PUBLICATIONS

U.S. Appl. No. 12/110,913, filed Apr. 2008, Lara-Curzio et al.*
(Continued)

*Primary Examiner* — Patrick Ryan
*Assistant Examiner* — Christopher Domone
(74) *Attorney, Agent, or Firm* — Nixon & Vanderhye P.C.

(57) ABSTRACT

The present invention generally relates to electrodes, electrical storage devices comprising the electrodes, and methods for producing the electrodes and electrical storage devices. The electrodes comprise a current collector, an electrically conductive mat, and a first and second electroactive material, the first electroactive material having a higher energy density than the second electroactive material, and the second electroactive material having a higher rate capability than the first electroactive material. The electrically conductive mat provides a structural and conductive support for at least one of the high-rate and high-energy electroactive materials. The electrodes can be provided in various configurations and be used in high-rate high-energy electrical storage devices to provide improved cycle life.

19 Claims, 21 Drawing Sheets

(51) Int. Cl.

| | | |
|---|---|---|
| *B82Y 30/00* | (2011.01) | |
| *H01M 4/14* | (2006.01) | |
| *H01G 11/46* | (2013.01) | |
| *H01G 11/86* | (2013.01) | |
| *H01M 12/00* | (2006.01) | |
| *H01G 11/26* | (2013.01) | |
| *H01G 11/28* | (2013.01) | |
| *H01G 11/30* | (2013.01) | |
| *H01M 4/20* | (2006.01) | |
| *H01M 4/36* | (2006.01) | |
| *H01M 4/48* | (2010.01) | |
| *H01M 4/62* | (2006.01) | |
| *H01M 4/66* | (2006.01) | |
| *H01M 4/73* | (2006.01) | |
| *H01M 4/74* | (2006.01) | |
| *H01M 10/06* | (2006.01) | |

(52) U.S. Cl.
CPC ............ *H01G 11/46* (2013.01); *H01G 11/86* (2013.01); *H01M 4/20* (2013.01); *H01M 4/366* (2013.01); *H01M 4/48* (2013.01); *H01M 4/625* (2013.01); *H01M 4/663* (2013.01); *H01M 4/73* (2013.01); *H01M 4/74* (2013.01); *H01M 10/06* (2013.01); *H01M 12/005* (2013.01); *H01M 2300/0011* (2013.01); *Y02E 60/126* (2013.01); *Y02E 60/13* (2013.01); *Y10T 29/49115* (2015.01)

(56) References Cited

U.S. PATENT DOCUMENTS

| | | | |
|---|---|---|---|
| 4,215,190 A | 7/1980 | Ferrando et al. | |
| 4,422,987 A | 12/1983 | Arimatsu | |
| 4,507,372 A | 3/1985 | Rowlette | |
| 4,567,284 A | 1/1986 | Monzyk et al. | |
| 4,576,879 A | 3/1986 | Nakazawa et al. | |
| 4,770,954 A | 9/1988 | Noordenbos | |
| 4,882,132 A | 11/1989 | Monzyk et al. | |
| 4,975,253 A | 12/1990 | Monzyk et al. | |
| 5,069,990 A | 12/1991 | Yoshimura et al. | |
| 5,077,151 A | 12/1991 | Yasuda et al. | |
| 5,154,989 A | 10/1992 | Howard et al. | |
| 5,252,105 A | 10/1993 | Witherspoon et al. | |
| 5,260,855 A | 11/1993 | Kaschmitter et al. | |
| 5,384,685 A | 1/1995 | Tong et al. | |
| 5,393,617 A | 2/1995 | Klein | |
| 5,419,977 A | 5/1995 | Weiss et al. | |
| 5,429,893 A | 7/1995 | Thomas | |
| 5,439,756 A | 8/1995 | Anani et al. | |
| 5,455,999 A | 10/1995 | Weiss et al. | |
| 5,458,043 A | 10/1995 | Jensen et al. | |
| 5,464,453 A | 11/1995 | Tong et al. | |
| 5,491,399 A | 2/1996 | Gregory et al. | |
| 5,518,833 A | 5/1996 | Repplinger et al. | |
| 5,526,223 A | 6/1996 | Wu et al. | |
| 5,529,971 A | 6/1996 | Kaschmitter et al. | |
| 5,534,369 A | 7/1996 | Nagaura | |
| 5,547,783 A | 8/1996 | Funato et al. | |
| 5,574,353 A | 11/1996 | Bai et al. | |
| 5,587,250 A | 12/1996 | Thomas et al. | |
| 5,604,426 A | 2/1997 | Okamura et al. | |
| 5,626,729 A | 5/1997 | Thompson et al. | |
| 5,670,266 A | 9/1997 | Thomas et al. | |
| 5,705,259 A | 1/1998 | Mrotek et al. | |
| 5,744,258 A | 4/1998 | Bai et al. | |
| 5,781,403 A | 7/1998 | Aoki et al. | |
| 5,789,338 A | 8/1998 | Kaschmitter et al. | |
| 5,821,006 A | 10/1998 | Patel et al. | |
| 5,821,007 A | 10/1998 | Harshe et al. | |
| 5,849,426 A | 12/1998 | Thomas et al. | |
| 5,916,699 A | 6/1999 | Thomas et al. | |
| 5,935,724 A | 8/1999 | Spillman et al. | |
| 5,935,728 A | 8/1999 | Spillman et al. | |
| 5,960,898 A | 10/1999 | Okada et al. | |
| 5,993,983 A | 11/1999 | Rozon | |
| 6,011,379 A | 1/2000 | Singh et al. | |
| 6,072,691 A | 6/2000 | Suhara et al. | |
| 6,087,812 A | 7/2000 | Thomas et al. | |
| 6,088,217 A | 7/2000 | Patel et al. | |
| 6,117,585 A | 9/2000 | Anani et al. | |
| 6,190,805 B1 | 2/2001 | Takeuchi et al. | |
| 6,195,252 B1 | 2/2001 | Belyakov et al. | |
| 6,208,502 B1 | 3/2001 | Hudis et al. | |
| 6,208,878 B1 | 3/2001 | Hattori et al. | |
| 6,222,723 B1 | 4/2001 | Razoumov et al. | |
| 6,252,762 B1 | 6/2001 | Amatucci | |
| 6,294,893 B1 | 9/2001 | De Abreu | |
| 6,304,467 B1 | 10/2001 | Nebrigic | |
| 6,310,789 B1 | 10/2001 | Nebrigic et al. | |
| 6,316,563 B2 | 11/2001 | Naijo et al. | |
| 6,331,365 B1 | 12/2001 | King | |
| 6,333,123 B1 | 12/2001 | Davis et al. | |
| 6,466,429 B1 | 10/2002 | Volfkovich et al. | |
| 6,509,116 B1 | 1/2003 | Kurosaki et al. | |
| 6,509,713 B2 | 1/2003 | de Abreu | |
| 6,517,972 B1 | 2/2003 | Amatucci | |
| 6,541,140 B1 | 4/2003 | Spillman et al. | |
| 6,576,365 B1 | 6/2003 | Meitav et al. | |
| 6,585,915 B2 | 7/2003 | Shinozaki et al. | |
| 6,610,440 B1 | 8/2003 | LaFollette et al. | |
| 6,623,884 B1 | 9/2003 | Spillman et al. | |
| 6,628,504 B2 | 9/2003 | Volfkovich et al. | |
| 6,631,073 B1 | 10/2003 | Sakata et al. | |
| 6,643,151 B1 | 11/2003 | Nebrigic et al. | |
| 6,646,415 B1 | 11/2003 | Nebrigic et al. | |
| 6,653,014 B2 | 11/2003 | Anderson et al. | |
| 6,680,600 B2 | 1/2004 | Emori et al. | |
| 6,687,116 B2 | 2/2004 | Hudis | |
| 6,706,079 B1 | 3/2004 | Shmatko et al. | |
| 6,737,822 B2 | 5/2004 | King | |
| 6,749,963 B2 | 6/2004 | Kurosaki et al. | |
| 6,765,363 B2 | 7/2004 | LaFollette et al. | |
| 6,869,731 B2 | 3/2005 | Nobuta et al. | |
| 6,887,617 B2 | 5/2005 | Sato et al. | |
| 6,911,273 B2 | 6/2005 | Faris | |
| 7,006,346 B2 | 2/2006 | Volfkovich et al. | |
| 7,035,084 B2 | 4/2006 | Kaneko et al. | |
| 7,049,792 B2 | 5/2006 | King | |
| 7,057,880 B2 | 6/2006 | Kurosaki et al. | |
| 7,074,688 B2 | 7/2006 | Kurihara et al. | |
| 7,083,876 B2 | 8/2006 | Honbo et al. | |
| 7,110,242 B2 | 9/2006 | Adrianov et al. | |
| 7,119,047 B1 | 10/2006 | Adrianov et al. | |
| 7,144,654 B2 | 12/2006 | LaFollette et al. | |
| 7,166,384 B2 | 1/2007 | LaFollette et al. | |
| 7,186,473 B2 | 3/2007 | Shiue et al. | |
| 7,358,008 B2 | 4/2008 | Nanno et al. | |
| 7,397,650 B2 | 7/2008 | Sato et al. | |
| 7,420,295 B2 | 9/2008 | Omae et al. | |
| 7,462,419 B2 | 12/2008 | LaFollette et al. | |
| 7,468,221 B2 | 12/2008 | LaFollette et al. | |
| 7,649,335 B2 | 1/2010 | Ishikawa et al. | |
| 7,742,279 B2 | 6/2010 | Takahashi et al. | |
| 7,862,931 B2 | 1/2011 | Furukawa et al. | |
| 7,923,151 B2 | 4/2011 | Lam et al. | |
| 8,017,273 B2 | 9/2011 | Lara-Curzio et al. | |
| 8,057,937 B2 | 11/2011 | Sung et al. | |
| 2001/0009734 A1 | 7/2001 | Clough | |
| 2001/0011119 A1 | 8/2001 | Naijo et al. | |
| 2001/0033501 A1 | 10/2001 | Nebrigic | |
| 2001/0044045 A1 | 11/2001 | Sato et al. | |
| 2002/0036478 A1 | 3/2002 | De Abreu | |
| 2002/0037452 A1 | 3/2002 | Schmidt | |
| 2002/0058185 A1 | 5/2002 | Kurosaki et al. | |
| 2002/0096661 A1 | 7/2002 | Shinozaki et al. | |
| 2002/0132164 A1 | 9/2002 | Kaneko et al. | |
| 2002/0155327 A1 | 10/2002 | Faris | |
| 2002/0158606 A1 | 10/2002 | King | |
| 2002/0161146 A1 | 10/2002 | Naijo et al. | |
| 2002/0163771 A1 | 11/2002 | Volfkovich et al. | |
| 2002/0176221 A1 | 11/2002 | Hudis | |

(56) References Cited

U.S. PATENT DOCUMENTS

| | | |
|---|---|---|
| 2002/0182485 A1 | 12/2002 | Anderson et al. |
| 2002/0196597 A1 | 12/2002 | Volfkovich et al. |
| 2003/0006737 A1 | 1/2003 | LaFollette et al. |
| 2003/0007317 A1 | 1/2003 | Hudis |
| 2003/0008212 A1 | 1/2003 | Akashi et al. |
| 2003/0011964 A1 | 1/2003 | Hudis |
| 2003/0035982 A1 | 2/2003 | Ryu et al. |
| 2003/0049528 A1 | 3/2003 | Honbo et al. |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |
| 2003/0152815 A1 | 8/2003 | LaFollette et al. |
| 2003/0188901 A1 | 10/2003 | Ovshinsky et al. |
| 2003/0219653 A1 | 11/2003 | Kelley et al. |
| 2003/0232238 A1 | 12/2003 | Fleming et al. |
| 2004/0009161 A1 | 1/2004 | Escary |
| 2004/0018421 A1 | 1/2004 | LaFollette et al. |
| 2004/0038087 A1 | 2/2004 | Shiue et al. |
| 2004/0053124 A1 | 3/2004 | LaFollette et al. |
| 2004/0057194 A1 | 3/2004 | Hudis et al. |
| 2004/0091777 A1 | 5/2004 | Lam et al. |
| 2004/0112486 A1 | 6/2004 | Aust et al. |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | LaFollette et al. |
| 2005/0110457 A1 | 5/2005 | LaFollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0221191 A1 | 10/2005 | Kondo et al. |
| 2005/0253458 A1 | 11/2005 | Omae et al. |
| 2005/0260497 A1 | 11/2005 | Kumashiro et al. |
| 2006/0038536 A1 | 2/2006 | LaFollette et al. |
| 2006/0115732 A1 | 6/2006 | Zaghib et al. |
| 2006/0172196 A1 | 8/2006 | Fukunaga |
| 2006/0223701 A1 | 10/2006 | Adrianov et al. |
| 2006/0269801 A1 | 11/2006 | Honbo et al. |
| 2007/0104981 A1* | 5/2007 | Lam et al. ............ 429/7 |
| 2007/0128472 A1 | 6/2007 | Tierney et al. |
| 2007/0247787 A1 | 10/2007 | Nakagawa et al. |
| 2008/0197810 A1 | 8/2008 | Ishikawa et al. |
| 2008/0199737 A1 | 8/2008 | Kazaryan et al. |
| 2008/0206638 A1 | 8/2008 | Takahashi et al. |
| 2008/0264291 A1 | 10/2008 | Pike et al. |
| 2008/0318135 A1 | 12/2008 | Sung et al. |
| 2009/0059474 A1 | 3/2009 | Zhamu et al. |
| 2009/0272946 A1 | 11/2009 | Lu |
| 2009/0291360 A1 | 11/2009 | Kim et al. |
| 2010/0015531 A1 | 1/2010 | Dickinson et al. |
| 2010/0075210 A1 | 3/2010 | Lee et al. |
| 2010/0175934 A1 | 7/2010 | Lam et al. |
| 2010/0203362 A1 | 8/2010 | Lam et al. |
| 2010/0214722 A1 | 8/2010 | Fujii et al. |
| 2011/0151286 A1 | 6/2011 | Lam et al. |
| 2011/0177392 A1 | 7/2011 | Hoshiba |
| 2012/0094174 A1 | 4/2012 | Furukawa et al. |
| 2012/0258336 A1 | 10/2012 | Jun et al. |
| 2012/0263977 A1 | 10/2012 | Furukawa et al. |
| 2014/0127565 A1 | 5/2014 | Furukawa et al. |

FOREIGN PATENT DOCUMENTS

| | | |
|---|---|---|
| CN | 101132065 | 2/2008 |
| CN | 101414691 | 4/2009 |
| EP | 0 354 966 A1 | 2/1990 |
| EP | 0 555 422 A1 | 8/1993 |
| EP | 0 662 726 A2 | 7/1995 |
| EP | 0 801 834 A1 | 10/1997 |
| EP | 0 851 445 A2 | 7/1998 |
| EP | 0 872 908 A1 | 10/1998 |
| EP | 0 893 790 A2 | 1/1999 |
| EP | 0 934 607 A1 | 8/1999 |
| EP | 0 964 416 A1 | 12/1999 |
| EP | 1 000 796 A2 | 5/2000 |
| EP | 1 071 148 A2 | 1/2001 |
| EP | 1 115 130 A1 | 7/2001 |
| EP | 1 126 536 A2 | 8/2001 |
| EP | 1 179 871 A2 | 2/2002 |
| EP | 1 189 295 A2 | 3/2002 |
| EP | 1 190 480 A1 | 3/2002 |
| EP | 1 251 576 A2 | 10/2002 |
| EP | 1 309 028 A2 | 5/2003 |
| EP | 1 315 227 A2 | 5/2003 |
| EP | 1 391 961 A1 | 2/2004 |
| EP | 1 418 428 A1 | 5/2004 |
| EP | 1 496 556 A1 | 1/2005 |
| EP | 1 541 422 A1 | 6/2005 |
| EP | 1 386 336 B1 | 1/2006 |
| EP | 1 775 786 A1 | 4/2007 |
| EP | 1 783 792 A1 | 5/2007 |
| EP | 1 561 105 B1 | 11/2009 |
| EP | 2 184 796 A1 | 5/2010 |
| FR | 2 692 077 | 12/1993 |
| JP | S59-105266 A | 6/1984 |
| JP | S61-283173 A | 12/1986 |
| JP | 62-103976 | 5/1987 |
| JP | 03-129667 | 6/1991 |
| JP | H04-43557 | 2/1992 |
| JP | 4-233170 A | 8/1992 |
| JP | 4-294515 A | 10/1992 |
| JP | H06-128317 | 5/1994 |
| JP | 09-092272 | 4/1997 |
| JP | H10-021900 | 1/1998 |
| JP | 10-50565 A | 2/1998 |
| JP | H10-294135 | 11/1998 |
| JP | H11-097319 | 4/1999 |
| JP | H11-224699 | 8/1999 |
| JP | 2000-1595 | 1/2000 |
| JP | 2000-13915 | 1/2000 |
| JP | 2000-21408 | 1/2000 |
| JP | 2000-77076 | 3/2000 |
| JP | 2000-235858 | 8/2000 |
| JP | 2001-110418 | 4/2001 |
| JP | 2001-126757 | 5/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2002-367613 A | 12/2002 |
| JP | 2003-51306 | 2/2003 |
| JP | 2003-77458 | 3/2003 |
| JP | 2003-87988 | 3/2003 |
| JP | 2003-132941 | 5/2003 |
| JP | 2003-200739 | 7/2003 |
| JP | 2003-308696 | 10/2003 |
| JP | 2004-47613 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |
| JP | 2005-50582 | 2/2005 |
| JP | 2005-050582 | 2/2005 |
| JP | 2005-80470 | 3/2005 |
| JP | 2005-160271 | 6/2005 |
| JP | 2005-183632 | 7/2005 |

(56) References Cited

FOREIGN PATENT DOCUMENTS

| | | |
|---|---|---|
| JP | 2005-248653 | 9/2005 |
| JP | 2005-294497 | 10/2005 |
| JP | 2005-327489 | 11/2005 |
| JP | 2005-353652 | 12/2005 |
| JP | 2006-156002 | 6/2006 |
| JP | 2006-252902 | 9/2006 |
| JP | 2006-310628 | 11/2006 |
| JP | 2006-325331 | 11/2006 |
| JP | 2007-12596 A | 1/2007 |
| JP | 2007-506230 A | 3/2007 |
| JP | 2007-226996 | 9/2007 |
| JP | 2007-280803 | 10/2007 |
| JP | 2008-22605 | 1/2008 |
| JP | 2008-47452 | 2/2008 |
| JP | 4061214 B2 | 3/2008 |
| JP | 2008-146898 | 6/2008 |
| JP | 2008-150270 | 7/2008 |
| JP | 2008-171766 | 7/2008 |
| JP | 2009-104827 | 5/2009 |
| JP | 2009-135056 | 6/2009 |
| JP | 2009-219960 | 10/2009 |
| TW | I268005 | 12/2006 |
| WO | WO89/06865 A1 | 7/1989 |
| WO | WO 92/11174 | 7/1992 |
| WO | WO93/05541 A1 | 3/1993 |
| WO | WO93/14511 A1 | 7/1993 |
| WO | WO94/07272 A1 | 3/1994 |
| WO | WO95/21466 A1 | 8/1995 |
| WO | WO95/23437 A1 | 8/1995 |
| WO | WO96/11522 A1 | 4/1996 |
| WO | WO 96/12313 | 4/1996 |
| WO | WO96/17361 A1 | 6/1996 |
| WO | WO96/30959 A1 | 10/1996 |
| WO | WO97/12415 A1 | 4/1997 |
| WO | WO98/08266 A1 | 2/1998 |
| WO | WO98/19357 A1 | 5/1998 |
| WO | WO 98/24100 | 6/1998 |
| WO | WO98/40925 A1 | 9/1998 |
| WO | WO98/40926 A1 | 9/1998 |
| WO | WO98/54816 A2 | 12/1998 |
| WO | WO99/24996 A1 | 5/1999 |
| WO | WO00/02213 A1 | 1/2000 |
| WO | WO00/11688 A1 | 3/2000 |
| WO | WO00/63929 A1 | 10/2000 |
| WO | WO01/01553 A1 | 1/2001 |
| WO | WO01/17054 A1 | 3/2001 |
| WO | WO01/41232 A2 | 6/2001 |
| WO | WO01/95410 A1 | 12/2001 |
| WO | WO02/01655 A2 | 1/2002 |
| WO | WO02/052664 A2 | 7/2002 |
| WO | WO02/087006 A1 | 10/2002 |
| WO | WO02/091412 A1 | 11/2002 |
| WO | WO02/099956 A2 | 12/2002 |
| WO | WO03/036670 A2 | 5/2003 |
| WO | WO03/055791 A2 | 7/2003 |
| WO | WO 03/077333 | 9/2003 |
| WO | WO03/088385 A1 | 10/2003 |
| WO | WO03/094184 A1 | 11/2003 |
| WO | WO03/098648 A1 | 11/2003 |
| WO | WO2004/008560 A2 | 1/2004 |
| WO | WO2004/012964 A1 | 2/2004 |
| WO | WO2004/038051 A1 | 5/2004 |
| WO | WO2004/042394 A2 | 5/2004 |
| WO | WO2005/027255 A1 | 3/2005 |
| WO | WO2005/041343 A1 | 5/2005 |
| WO | WO2006/006218 A1 | 1/2006 |
| WO | WO2006/062349 A1 | 6/2006 |
| WO | WO 2006/109909 | 10/2006 |
| WO | WO2006/132052 A2 | 12/2006 |
| WO | WO 2007/017506 | 2/2007 |
| WO | WO 2007/034873 | 3/2007 |
| WO | WO 2007/050466 | 5/2007 |
| WO | WO2007/058421 A1 | 5/2007 |
| WO | WO 2007/097534 | 8/2007 |
| WO | WO2008/016236 A1 | 2/2008 |
| WO | WO 2008/051885 | 5/2008 |
| WO | WO 2008/070914 | 6/2008 |
| WO | WO2008/101190 A1 | 8/2008 |
| WO | WO 2008/113133 | 9/2008 |
| WO | WO 2009/013796 | 1/2009 |
| WO | WO 2009/041180 | 4/2009 |
| WO | WO 2009/071292 | 6/2009 |
| WO | WO 2009/005170 | 8/2009 |
| WO | WO 2009/094931 | 8/2009 |
| WO | WO 2009/101047 | 8/2009 |
| WO | WO 2009/128482 | 10/2009 |
| WO | WO 2010/122873 A1 | 10/2010 |

OTHER PUBLICATIONS

U.S. Appl. No. 12/156,644, filed Jun. 2008, Shi et al.*
English translation of JP Office Action in 2009-540546 mailed Nov. 8, 2013.
Chinese Patent Application No. 201080047297.07—First Notification of Office Action (English translation included), mailed Apr. 3, 2014.
European Patent Application No. 10814794.3—Search Report, mailed Dec. 2, 2013.
Japanese Patent Application No. 2012-52822—Office Action (English translation included), mailed Apr. 22, 2014.
Lam LT et al., "Development of ultra-battery for hybrid-electric vehicle applications", Journal of Power Sources 158 (2006) 1140-1148.
U.S. Appl. No. 13/996,934, Furukawa et al., filed Jun. 21, 2013.
Office Action issued in U.S. Appl. No. 12/531,956 dated Nov. 6, 2014.
U.S. Office Action issued in U.S. Appl. No. 13/996,934 dated Jul. 9, 2015.
Office Action issued in U.S. Appl. No. 12/531,956 dated Jul. 28, 2015.
U.S. Appl. No. 12/518,521, Lam et al., filed Apr. 13, 2010.
Australian Patent Office, "Examiner's Report No. 2," issued in connection with Australian Patent Application No. 2004273104, dated Sep. 21, 2009.
International Searching Authority, "International Search Report," issued in connection with PCT/AU2004/001262, mailed Nov. 8, 2004.
International Searching Authority, "International Search Report," issued in connection with PCT/AU2007/001916, mailed Feb. 21, 2008.
International Searching Authority, "International Search Report," issued in connection with PCT/AU2008/000405, mailed May 20, 2008.
International Searching Authority, "International Search Report," issued in connection with PCT/JP2010/055479, mailed Jun. 22, 2010.
International Searching Authority, "International Search Report," issued in connection with PCT/JP2010/064984, mailed Nov. 22, 2010.
International Searching Authority, "International Search Report," issued in connection with PCT/JP2010/064985, mailed Nov. 30, 2010.
International Searching Authority, "International Search Report," issued in connection with PCT/AU2011/001647, mailed Mar. 23, 2012.
Derwent Abstract Accession No. 2006-643026/200667 & JP 2006-252902 (Kawasaki Heavy Ind Ltd.), published on Sep. 21, 2006 (2 pages).
Derwent Abstract Accession No. 2006-003619/200601 & Jp 2005-327489 (Matsuhita Denki Sangyo KK.), published on Nov. 24, 2005 (2 pages).
Derwent Abstract Accession No. 2006-036969/200705 & JP 2006-310628 (Nippon Zeon KK), published on Nov. 9, 2006 (2 pages).
Derwent Abstract Accession No. 2006-110075/200774, for WO 06/006218, Osaka Gas Co Ltd., published on Jan. 19, 2006, 2 pages.
Derwent Abstract Accession No. 2004-683934/200467, for JP 2004-273443, Mitsubishi Chem Corp., published on Sep. 30, 2004, 2 pages.

(56) References Cited

OTHER PUBLICATIONS

Derwent Abstract Accession No. 2004-395525/200441, for JP 2004-134369, Shin Kobe Electric Machinery., published on Apr. 30, 2004, 2 pages.
Derwent Abstract Accession No. 2005-135458/15, TDK Corp., (Jan. 27, 2005), 2 pages.
U.S. Patent and Trademark Office, "Non-Final Office Action," issued in connection with U.S. Appl. No. 13/265,944, dated Dec. 24, 2014.
U.S. Patent and Trademark Office, "Final Office Action," issued in connection with U.S. Appl. No. 13/265,944, dated Apr. 9, 2015.
Russian Patent Application No. 2012111222—Office Action (English translation included), mailed Aug. 27, 2014.
Russian Patent Application No. 2012111683—Office Action (English translation included), mailed Sep. 3, 2014.
Office Action issued in U.S. Appl. No. 13/265,944 dated Oct. 27, 2015.
Office Action issued in U.S. Appl. No. 13/996,934 dated Dec. 24, 2015.
Office Action issued in U.S. Appl. No. 13/392,651 dated Oct. 13, 2015.
Office Action issued in U.S. Appl. No. 13/392,734 dated Oct. 7, 2015.
International Search Report for PCT/AU2010/001113 mailed Oct. 27, 2010.
Office Action issued in U.S. Appl. No. 13/392,651 dated Mar. 23, 2016.

* cited by examiner

ELECTRICAL STORAGE DEVICE AND ELECTRODE THEREOF

This application is the U.S. national phase of International Application No. PCT/AU2010/001113 filed 27 Aug. 2010 which designated the U.S. and claims priority to JP 2009-196200 filed 27 Aug. 2009, AU 2010900189 filed 19 Jan. 2010, AU 2010901283 filed 26 Mar. 2010 and US Provisional Application Nos. 61/344,020 filed 7 May 2010 and 61/344,179 filed 4 Jun. 2010, the entire contents of each of which are hereby incorporated by reference.

FIELD

The present invention generally relates to electrodes, electrical storage devices comprising the electrodes, and methods for producing the electrodes and electrical storage devices.

BACKGROUND

Whilst there have been many significant advances in the development of new batteries and power networks for transportation and communication devices, different types of batteries can present problems when used in particular environments. For example, batteries currently used for electric powered vehicles suffer from a number of problems. High demands are placed on these batteries in terms of the current drawn from, and recharged to, the battery at various stages during vehicle operation. For example, in electric vehicles a high rate of discharge is needed from the battery to enable acceleration, and a high rate of recharging of the battery is associated with regenerative braking. In the situation where lead-acid batteries are utilised, particularly in hybrid electric vehicles, the high rate of battery discharging and recharging can result in the formation of a layer of lead sulphate on the surface of the negative plate, and the generation of hydrogen and oxygen gas at the negative and positive plates. This largely arises as a result of high current demands on the battery. The partial state-of-charge conditions (PSoC) under which these batteries generally operate is 20-100% for electric vehicles, 40-60% for hybrid electric vehicles, and 70-90% for mild hybrid electric vehicles. This is a high rate partial state-of-charge (HRPSoC). Under simulated HRPSoC duty, such as hybrid and mild hybrid electric vehicle operations, the lead-acid batteries can fail prematurely mainly due to the progressive accumulation of lead sulphate on the surfaces of the negative plates. This occurs because the lead sulphate cannot be converted efficiently back to sponge lead during charging either from the regenerative braking or from the engine. Eventually, this layer of lead sulphate develops to such an extent that the effective surface area of the plate is reduced markedly, and the plate can no longer deliver the higher current demanded from the automobile. This significantly reduces the potential lifespan of the battery.

Portable and rechargeable energy storage devices, such as rechargeable electrochemical batteries and capacitors, are becoming increasingly essential for powering a range of modern transportation and communication devices. As mentioned above, in many devices the combination of instantaneous high power or high rate along with high energy is required. Hybrid electrodes and batteries have been developed that combine an electroactive capacitor with an electrochemical battery to meet the peak power requirements of pulsed power applications. Although this type of combined construction can significantly enhance battery performance, such as providing enhanced cycle life, there are still various problems with such hybrid devices that still limit their overall performance and cycle life.

There is consequently a need to provide alternative electrodes and electrical storage devices including improved lead-acid batteries, which have an improved lifespan and/or performance compared to current batteries.

SUMMARY

The present invention generally provides an electrode for an electrical storage device. The invention also provides an electrical storage device comprising the electrode, such as a lead-acid battery comprising the electrode.

In a first aspect, there is provided an electrode for an electrical storage device comprising:
 a current collector;
 a first electroactive material;
 a second electroactive material; and
 an electrically conductive mat;
 wherein:
 the first electroactive material has a higher energy density than the second electroactive material, and the second electroactive material has a higher rate capability than the first electroactive material; and
 the electrically conductive mat provides structural and conductive support for at least one of the first electroactive material and the second electroactive material.

In one embodiment, the electrically conductive mat is capable of providing structural support for at least one of the first electroactive material and the second electroactive material to reduce shedding thereof from the electrode. In another embodiment, the electrically conductive mat is a carbon fibre sheet, for example a carbon fibre non-woven sheet. The electrically conductive mat may be porous and/or may comprise a network of interconnected electrically conductive fibres.

Each of the first electroactive material, the second electroactive material and the electrically conductive mat, may be provided on the current collector, or on each other, as a coating, layer or region, in any order or arrangement, and may be arranged with other coatings, layers (including intervening layers) or materials. Any one or more regions, layers or coatings, may comprise the first and second electroactive materials, or any one or more regions, layers or coatings may comprise the first electroactive material and/or the second electroactive material, optionally with one or more additives, which may include binders or binding agents, thickeners, fibres, conducting materials and pore forming agents. The first electroactive material can be intermixed in various amounts with the second electroactive material in any one or more regions, coatings or layers, or the first electroactive material may be provided in one or more separate regions, coatings or layers to that of the second electroactive material.

In one embodiment, the electrically conductive mat comprises one or more coatings, layers or regions comprising at least one of the first electroactive material and second electroactive material. In another embodiment, the electrically conductive mat comprises one or more coatings, layers or regions consisting of the first electroactive material or second electroactive material, optionally with one or more additives. In another embodiment, the electrically conductive mat is provided as an intervening layer separating the first electroactive material from the second electroactive material. In another embodiment, at least one of the first electroactive material and the second electroactive material is deposited on and/or incorporated within the electrically conductive mat.

In another embodiment, one of the first and second electroactive materials is provided as a first discrete layer deposited on the current collector, and the other of the first and second electroactive materials is provided as a second discrete layer deposited on the first discrete layer, and wherein the electrically conductive mat is provided as a third discrete layer in contact with the second discrete layer.

In another embodiment, the first electroactive material is provided as a first discrete layer deposited on the current collector, and the electrically conductive mat is provided as a second discrete layer in contact with the first discrete layer, and the second electroactive material is provided as a third discrete layer deposited on the second discrete layer.

The first electroactive material can be selected from the group consisting of La, Li, Na, Al, Fe, Zn, Cd, Pb, Sn, Bi, V, Mn, Co, Ni, Ag and their alloys, oxides, hydroxides, hydrides, carbides, nitride or sulfites, carbon, polyaniline, polythiophene, polyfluorophenylthiopene, polypyrolle, n or p-doped polymers, redox polymers, and mixtures thereof. In one embodiment, the first electroactive material is a lead based material, for example, sponge lead, which is typically used on a negative electrode for a lead-acid battery, or lead dioxide, which is typically used on a positive electrode for a lead-acid battery, or a material capable of forming sponge lead or lead dioxide electrode material on activation thereof.

The second electroactive material can be selected from the group consisting of Nb, Hf, Ti, Ta, Li, Fe, Zn, Sn, Ru, Ag, Pt, Ir, Pb, Mo, W, Ni, Co and their oxides, hydroxides, hydrides, carbides, nitride or sulfites, carbon, polyaniline, polythiophene, polyfluorophenylthiopene, polypyrolle, n or p-doped polymers, redox polymers, and mixtures thereof. In one embodiment, the second electroactive material is selected from the group consisting of high-surface area carbon, ruthenium oxide, silver oxide, cobalt oxide and conducting polymers. The high surface area carbon may be activated carbon, carbon black, amorphous carbon, carbon nanoparticles, carbon nanotubes, carbon fibres, or a mixture thereof. In one embodiment, the second electroactive material is activated carbon.

In a second aspect, there is provided an electrical storage device comprising at least one pair of negative and positive electrodes, wherein at least one electrode is an electrode according to the first aspect described herein.

The electrode according to the first aspect can comprise a negative electrode of the electrical storage device where the first electroactive material is selected from one or more of the group consisting of cadmium, metal hydrides, lead and zinc. In one embodiment, the first electroactive material is lead.

The electrode according to the first aspect can comprise a positive electrode of the electrical storage device where the first electroactive material is selected from one or more of the group consisting of nickel oxide, lead oxide and silver. In one embodiment, the first electroactive material is lead oxide.

In one embodiment, the electrical storage device is configured for operation under a compression force of less than about 80 kPa.

In a third aspect, there is provided an electrical storage device comprising at least one lead dioxide based positive electrode and at least one sponge lead based negative electrode in a sulphuric acid electrolyte solution, wherein the at least one sponge lead based negative electrode comprises:

a current collector;

a first layer deposited on the current collector, the first layer comprising sponge lead;

a second layer in contact with the first layer, the second layer comprising an electrically conductive mat comprising a network of interconnected electrically conductive carbon fibres;

a third layer deposited on the second layer, the third layer comprising a second electroactive material;

wherein the sponge lead has a higher energy density than the second electroactive material, and the second electroactive material has a higher rate capability than the sponge lead.

In a fourth aspect, there is provided a process for fabricating an electrode according to the first aspect described herein, the process comprising:

forming a composite layer comprising at least one of the first electroactive material and the second electroactive material deposited on and/or incorporated within the electrically conductive mat; and coupling the composite layer to the current collector.

In one embodiment, the process further comprises forming a coating of the first electroactive material on the current collector, and coupling the composite layer to the coating of the first electroactive material on the current collector.

BRIEF DESCRIPTION OF THE DRAWINGS

Preferred embodiments of the present invention will now be further described and illustrated, by way of example only, with reference to the accompanying drawings in which.

DETAILED DESCRIPTION OF THE ABBREVIATIONS

Figure 1A:
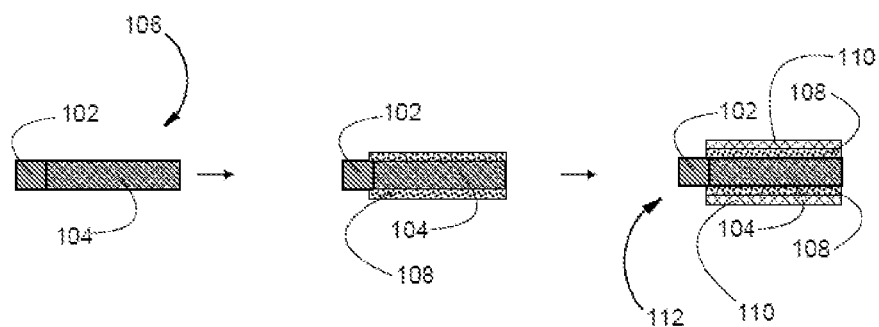
FIGS. 1a and 1b show a stepwise process for achieving two types of arrangements of an electrode according to embodiments of the present invention.

In the Examples, reference will be made to the following abbreviations in which:
APP Applications
C Celsius
Cl Class
[ ] Concentration
F Fahrenheit
h Hour
HRPSoC High rate partial state-of-charge
Mn Number average molecular weight
Mw Weight average molecular weight
MW Molecular weight
PSoC Partial state-of-charge conditions
RH Relative Humidity
SG Specific gravity or relative density with respect to water
SEM Scanning Electron Microscopy
Wt % Weight percentage of specific component in composition
XPS X-Ray Photoelectron Spectroscopy

DETAILED DESCRIPTION

In an attempt to identify alternative materials and arrangements in electrodes for improved performance batteries, it has now been found that an electrically conductive mat used with electrodes comprising a combination of two different electroactive materials, wherein one of the electroactive materials has a higher energy density and lower rate capability than the other electroactive material, can provide particular advantages including improved cycle life. Non-limiting particular embodiments of the present invention are described below.

The electrode of the present invention comprises a first electroactive material and a second electroactive material wherein the first electroactive material has a higher energy density than the second electroactive material, and the second electroactive material has a higher rate capability than the first electroactive material. For convenience the electroactive material having the higher energy density (the first electroactive material) is referred to below as the "high-energy electroactive material", and the electroactive material having the higher rate capability (the second electroactive material) is referred to below as the "high-rate electroactive material".

The present invention generally relates to an electrode for a high-rate high-energy electrical storage device comprising a current collector, a high-energy electroactive material, high-rate electroactive material, and an electrically conductive mat to provide a structural and conductive support for at least one of the high-rate and high-energy electroactive materials. The electrodes of the first aspect as described herein can be used in high-rate high-energy electrical storage devices.

General Terms

The term "high-rate" generally refers to the capability of a device or material to provide a high rate or high current of electrical discharge or recharge, which is facilitated by the device or material having a low internal resistance and a high surface area. A high-rate of discharge would be well known to be provided by conventional capacitor electrode materials capable of storing energy capacitively, such as high surface area carbon.

The term "high-energy" generally refers to the capability of a device or material to provide a high amount of electrical discharge or recharge, typically provided by a sustained duration of electrical discharge or recharge but at a low rate. A high-energy material would be considered to be provided by a conventional battery electrode material capable of storing energy electrochemically, such as lead paste used in lead-acid batteries.

The term "electroactive", "active electrode material" or like term, refers to the capability of a material to receive, store or provide a source of electrical charge and includes capacitor electrode materials capable of storing energy capacitively, and battery electrode materials capable of storing energy electrochemically.

Other particular terms have been described below where they are more appropriately described with reference to particular embodiments.

Electrode Structure

Electrodes generally comprise a current collector (typically a grid or plate) with an active electrode material applied thereto. The active electrode material is most commonly applied in a paste form to a region of the current collector. The paste may contain additives or materials other than the active electrode material.

The electrode may be of any suitable shape, although is typically in the form of a flat-plate (grid), or a spirally-wound plate for prismatic or spirally-wound cells. For simplicity of design, flat plates or grids are generally preferred. Current collectors usually provide the base structure of an electrode, and are typically formed from electrically conductive metals, for example a lead alloy is typically used as a current collector in lead-acid batteries. Furthermore, the materials used for the current collector should be stable in the electrolyte environment.

As described above, the present invention generally provides an electrode for a high-rate high-energy electrical storage device comprising: a current collector, a high-energy electroactive material, a high-rate electroactive material, and an electrically conductive mat that provides an electrically conductive structural and mechanical support for the high-rate and/or high-energy electroactive material.

Each of the high-energy electroactive material, the high-rate electroactive material and the electrically conductive mat, can be provided on the current collector, or on each other, as a coating, layer or region, and in any order or arrangement, and may be arranged with other materials or layers. Various arrangements and embodiments of the electrode are described as follows.

The first and second electroactive materials can be intermixed in any one or more coatings, layers or regions, optionally with one or more other additives. The first electroactive material can also be separated from the second electroactive material in any one or more coatings, layers or regions.

In one embodiment, the electrode has discrete first and second regions, wherein the high-energy electroactive material is disposed in one or more first regions and the high-rate electroactive material is disposed in one or more second regions. The first and second regions may be adjacent, spaced apart, overlapping, or layered one upon the other. The regions may be provided on the current collector and/or the electrically conductive mat, with the mat arranged to support any of the regions. The electrically conductive mat facilitates against the electroactive materials shedding from the electrode during use. In another example, the electrically conductive mat can be arranged as a layer over the current collector with the first and second regions located on a surface of the electrically conductive mat.

In another embodiment, one of the high-energy and high-rate electroactive materials can be provided as a first discrete layer deposited on the current collector, and the other of the high-energy and high-rate electroactive materials can then be provided as a second discrete layer deposited onto the first discrete layer, where the electrically conductive mat is a third discrete layer in contact with second discrete layer. In an alternative embodiment, the high-energy electroactive material can be provided as a first discrete layer deposited on the current collector, and the electrically conductive mat can be provided as a second discrete layer in contact with the first discrete layer, and the high-rate electroactive material provided as a third discrete layer deposited on the second discrete layer.

The high-rate and/or high-energy electroactive material can be deposited on and/or incorporated within the electrically conductive mat to form a composite layer. In one embodiment, the electrode comprises a composite layer comprising the electrically conductive mat coated with at least one of the high-rate and high-energy electroactive materials, and preferably with at least the high-rate electroactive material. With respect to the fabrication of an electrode or device containing the electrode, the composite layers can be pre-made and stored, and then assembled into the electrode or device at the appropriate time, which provides certain efficiencies in the fabrication of such electrodes and devices. For example, a composite layer may be applied, simultaneously, to each side of a doubled sided electrode to provide for an efficient manufacture of the electrode.

In another embodiment, the electrically conductive mat is provided as an intervening layer separating the high-energy electroactive material from the high-rate electroactive material. The intervening layer may be provided as a discrete layer. The porosity of the electrically conductive mat can also be selected to prevent the high-rate electroactive material from permeating through the electrically conductive mat. The selected porosity will depend on the nature of the device and the environment under which the device is intended to operate. For example, the high-rate material can be deposited on one side of the electrically conductive mat and the high-energy electroactive material deposited on the opposite side of the electrically conductive mat, with the porosity of the electrically conductive mat selected to maintain separation of the high-rate and high-energy electroactive materials.

The above electrode arrangements apply to forming both negative and positive battery electrodes.

Electroactive Materials

The "high-energy electroactive material" has a higher energy density than the "high-rate electroactive material", and the "high-rate electroactive material" has a higher rate capability than the "high-energy electroactive material". It will be appreciated that the absolute rate or energy values for these materials depend on a number of factors including the amounts and type of material, and the environments and configurations in which these materials are employed.

The "high-energy electroactive material" may be any material conventionally used in battery electrodes to provide high energy density. These materials typically provide a sustained energy output, but of a lower rate or power in comparison to a high-rate material. Examples of some common high-energy materials that have been used for anodes in rechargeable aqueous batteries include cadmium, metal hydrides, lead and zinc, while such materials for cathodes have been fabricated from nickel oxide, lead oxide, silver, and oxygen or air (with catalyst). Examples of high-energy anode materials for Li-ion rechargeable batteries include carbon (Li-intercalating), $WO_3$, and $TiS_2$, and $SnO_x$, with corresponding cathode materials including $Li_xNi_yO_z$, $LiCoO_2$, $LiMn_2O_2$, $Li_xTi_yO_z$, and $LiV_6O_{13}$, and where x, y and z vary between 0.1 and 10. Other high-energy materials include La, Li, Na, Al, Fe, Zn, Cd, Pb, Sn, Bi, C, V, Mn, Co, Ni, Ag and their oxides, hydroxides, hydrides, carbides, nitride or sulfites, and polyaniline, polythiophene, polyfluorophenylthiopene, polypyrolle, n- or p-doped polymers, redox polymers, and mixtures thereof. For example, electrical storage devices may comprise systems based on lithium ion, lithium metal, lithium metal hydride, nickel metal hydride, nickel and zinc, and nickel and silver based devices or electrode systems.

In one embodiment, the high-energy electroactive material is a lead based material, for example, for a lead-acid type battery, sponge lead for use as a negative electrode material and lead dioxide for use as a positive electrode material.

The "high-rate electroactive material" may be any high-rate (or high-power) material that generally exhibits the characteristics of capacitors. Such materials are well known in the art. These materials typically provide an initial high-rate or high-power output of a short duration, but have a lower energy density in comparison to a high-energy material. Examples of some high-rate materials that have been used in capacitors include high-surface area carbon, ruthenium oxide, silver oxide, cobalt oxide, and conducting polymers (such as polyaniline, polythiophene, polyfluorophenylthiopene, n- or p-doped polymers, redox polymers, or polypyrolle). Examples of high surface area carbon materials are activated carbon, carbon black, amorphous carbon, carbon nanoparticles, carbon nanotubes, carbon fibres and mixtures thereof. Other high-rate materials include C, Nb, Hf, Ti, Ta, Li, Fe, Zn, Sn, Ru, Ag, Pt, Ir, Pb, Mo, W, Ni, Co and their oxides, hydroxides, hydrides, carbides, nitride or sulfites, and mixtures thereof.

The high-energy electroactive material and the high-rate electroactive material are typically provided as regions, layers or coatings on the electrode. The electroactive material can be applied to or coated on a current collector, electrically conductive mat or one or more other components of the electrodes, for example as a paste with a binder or binding agents such as carboxymethyl cellulose, neoprene, styrene butadiene rubber, polytetrafluoroethylene (PTFE) or polyvinalidenefluoride (PVDF)/kynar and combinations thereof, and optionally with one or more other additives including conducting materials such as carbon black, plastic or carbon fibres, thickeners or pore forming agents. The high-energy electroactive material can be coated onto a current collector, electrically conductive mat or one or more other components of the electrode, without the need for a binder or binding agent(s).

The paste for applying the high-rate electroactive material onto one or more components of the electrodes often comprises other materials to obtain an appropriate balance between surface area (and thus capacitance) and conductivity. Currently, for cost reasons, activated carbon is the most appropriate source of the high-rate electroactive material. A suitable activated carbon material can have a surface area at least 500 $m^2/g$, for example, in the range of about 1000 and 3500 $m^2/g$. A suitable carbon black material may comprise a surface area of between 20-1000 $m^2/g$.

The electroactive materials can be used in combination with one or more additives. An additive can include a binder or binding agents, thickeners, fibres, conducting materials and pore forming agents. The additives may be provided in a mixture or paste comprising the electroactive material to form part of a region, coating or layer, and improve performance of the electrode.

A pore forming agent can be selected from one or more of the group of zinc powder, camphor powder, naphthalene powder and aluminium powder. The pore forming agent increases the porosity of a region, coating or layer comprising the electroactive material, and facilitates supply of electrolyte to the surface of an electrode to improve high rate discharge.

The conducting material provides a sufficient amount of electrical conductivity to the region, coating or layer, and may include carbon black or other conducting materials. The conducting material can be provided in at least 5% by weight of the region, coating, layer, mixture or paste, for example in a range of 10 to 60% by weight.

The binder or binding agent is useful for improving the binding of the materials together and on surface of a current collector, electrode or electrically conductive mat. The binder can also provide an electrical interconnection between materials, regions, layers, coatings, or electrode components, and facilitate maintaining a sufficient degree of porosity when materials are dried. A binder or binding agent may include polychloroprene, styrene-butadiene rubber (SBR), polytetrafluoroethylene (PTFE), polyvinylidene fluoride (PVDF). A binder may be provided in a range of 1 to 20% by weight in the region, coating or layer, for example in a range of 5 to 15% by weight.

A thickener, which may also be referred to as a binder or binding agent, is useful for preparing a mixture of materials in the form of paste. For the aqueous paste, cellulose derivatives such as carboxymethyl cellulose (CMC) and methyl cellulose (MC), polyacrylic acid salts, polyvinyl alcohol and the like are suitable, and for the organic paste, NMP (N-methyl-2-pyrrolidone, 1-methyl-2-pyrrolidone), dimethyl sulfoxide (DMSO) and the like are suitable. The thickeners may be provided such that the dried residue does not exceed 10% by weight to maintain a sufficient amount of electrical conductivity, for example in a range of 1 to 6% by weight in the region, coating or layer.

Fibres may include plastic, glass or carbon fibres. Fibres can provide a reinforcing material and improve permeability of gas produced in the electrode during operation. Plastic fibres may include polyester resin such as polyethylene terephthalate (PET) or the like. The fibres are typically short, for example in a range of 1 to 30 µm in thickness and 0.05 to 4.0 mm in length. The fibres may be provided in an amount of less than about 15%, for example in the range of 4 to 12% by weight.

A suitable mixture of these materials can comprise between 0-80% carbon black, 15-95% activated carbon, 0-10% plastic and/or carbon fibres, and the balance binder at a level of between 5-25%. All measurements are by weight unless specified otherwise. It will be appreciated in the above and below embodiments that carbon black may be substituted for other conducting materials or mixtures of conducting materials, and activated carbon may be substituted for other high rate materials or mixtures of high rate materials. Unless indicated otherwise, these mixtures may be used for negative or positive electrodes, although further advantages may exist when used for specific electrodes and configurations in particular types of battery systems.

Another suitable mixture may comprise activated carbon 1-95% (as the high rate material), a binder 5-20% (e.g. neoprene and/or carboxymethyl cellulose), carbon black 0-80%, and plastic and/or carbon fibres 0-5%. Advantages are provided by embodiments where the high-rate electroactive material is dispersed on or within, or in contact with (e.g. by layering or coating), a conductive material or component, such as carbon black or the electrically conductive mat. For particular embodiments where the high-rate electroactive material is in contact with the electrically conductive mat, the amount of conductive material used (e.g. carbon black) in the mixture may be reduced or omitted. For example, a paste comprising a high-rate electroactive material, a binding agent and a conducting material, which would be suitable for application to an electrically conductive mat, can comprise less than 30 wt %, less than 20 wt %, less than 10 wt % or less than 5 wt % conducting material. The binding and thickening agents may be provided in the range of 5-25%. The paste may also comprise greater than 60 wt %, greater than 70 wt %, greater than 80 wt %, or greater than 90 wt % high-rate electroactive material. Conductive materials such as carbon black typically include impurities that can cause gassing problems in certain battery systems. The electrically conductive mat in these embodiments can therefore provide conductive properties to a region of the high-rate electroactive material in addition to structural and mechanical support properties. It will be appreciated that in embodiments where the high-rate electroactive material is separated from the electrically conductive mat, then a conductive material such as carbon black can be used in admixture with a high-rate electroactive material to improve performance.

In an embodiment, the high-rate electroactive material is activated carbon, preferably having a surface area between about 1000 and 3500 m²/g. The activated carbon can be prepared in the form of a paste by using a binder or thickener, for example neoprene and/or carboxymethyl cellulose mixture in an amount between 5-20%. The paste can comprise 80-95% activated carbon and 5-20% binder, for example a paste comprising 85% activated carbon and 15% binder. As mentioned above, these embodiments may provide further advantages for electrode configurations where the high-rate electroactive material is in contact with the electrically conductive mat (e.g. region, coating or layer of the high-rate electroactive material provided on the electrically conductive mat).

In another embodiment, the paste comprises: activated carbon in a range between about 20-50% by weight; carbon black in a range between about 30-60% by weight; and binder in a range between about 5 to 25% by weight. For example, the paste can comprise: activated carbon of about 35% by weight; carbon black of about 45% by weight; binder of about 10% by weight, and the remainder comprising one or more other additives. In one embodiment, the paste can comprise 35% activated carbon, 45% carbon black, 15% binder, and plastic/carbon fibre particles 5%. As mentioned above, these embodiments may provide further advantages for electrode configurations where the high-rate electroactive material is not in contact with the electrically conductive mat.

Typically, the ratio of high-rate electroactive material to high-energy electroactive material used in a single electrode is in the range of about 3:17 to 1:19 respectively on a by weight basis. For example, about 10 g of high-rate electroactive material can be used as a layer on an electrode previously coated with 100 g of high-energy electroactive material.

Electrically Conductive Mat

The electrically conductive mat may comprise any material that has a high degree of electrical conductivity, and consequently a low internal resistance, which is capable of providing physical or mechanical support for the high-rate and/or high-energy electroactive material on the electrode. The electrically conductive mat provides support for the high-rate and/or high-energy electroactive materials, facilitating against the shedding of these materials from the electrode during charging and discharging of the energy storage device. The electrically conductive mat is typically stable in the desired electrolyte environment. The electrically conductive mat serves as a current collector (e.g. increasing conductivity) and provides a physical support for the electroactive material (e.g. increasing mechanical strength). The electrically conductive mat may be porous and may comprise a network of interconnected electrically conductive fibres, for example a carbon fibre non-woven sheet. The electrically conductive mat may be woven or non-woven.

The electrically conductive mat may provide support for the first electroactive material, the second electroactive material or both electroactive materials.

The electrically conductive mat provides a supporting layer that may be associated with the high-rate and/or high-energy electroactive material by any adhesion, attachment, removable attachment, or non-attachment. Other intervening layers may also be associated with the electrically conductive mat, the high-rate and/or the high-energy electroactive material by way of adhesion, attachment, removable attachment, or non-attachment. The electrically conductive mat is typically semi-rigid or rigid and may be in the form of a film, membrane, matrix, or sheet. The electrically conductive mat may comprise a sheet or layer comprising a network of interconnected electrically conductive fibres disposed thereon, for example carbon fibres held on a supporting sheet. Depending on the intended use, the electrically conductive mat may be selected from materials that limit gas formation during high-rate charging and discharging of an energy storage device.

An example of an electrically conductive mat includes a layer formed from a carbon fibre material such as a carbon fibre non-woven sheet. Other examples of an electrically conductive mat may include interconnected networks formed from materials including conducting ceramics, conducting glass fibres and conducting plastics. It will be appreciated that the electrically conductive mat comprises a degree of porosity to enable permeability for a liquid electrolyte. For example, a suitable porosity may be in the range of 40-80%.

One specific example of a suitable electrically conductive mat would be a carbon fibre nonwoven sheet having the following properties:
Basic weight: 10-70 g/m²
Thickness: 0.06-0.55 mm
MD tensile: 0.91-4.3 kN/m
CD tensile: 0.52-4.3 kN/m
Surface resistivity: 3-10 DC Ω/m²

In one embodiment, the electrically conductive mat is a carbon fibre sheet, which is preferably a thin non-woven sheet providing a partially ordered structure ensuring good electron conductance along the fibres, and a nearly stationary spatial fixing of the fibres ensuring good contact between them. As with other carbon materials, the sheet has low internal resistance, which is an ideal characteristic required for use in combination with high-rate capacitor and high-energy electrochemical materials. The inventor has found that in electrodes comprising a high-energy material and a high-rate material, the high-rate material can partially shed during cycling. The inventor has further found that this shedding can be reduced or prevented by using an electrically conductive mat to provide structural support for the high-rate material.

In some embodiments, the high-rate and/or high-energy material is deposited on, and incorporated within, the electrically conductive mat. In this arrangement, the electrically conductive mat facilitates against the high-rate and/or high-energy materials shedding from the electrode during high-rate charging and discharging of the energy storage device, for example on formation of gassing in lead-acid batteries.

In another embodiment, the electrically conductive mat can provide support for a discrete layer or region of the high-rate and/or high-energy electroactive materials, and preferably at least a discrete layer or region of the high-rate electroactive material.

In another embodiment, at least a region in the interior and/or a surface of the electrically conductive mat comprises the high-rate and/or high-energy electroactive material. The electrically conductive mat may be selected to comprise a degree of porosity such that any material applied to one side of the mat cannot permeate or move through to the opposing side of the mat.

The high-rate and/or high-energy electroactive material may be deposited on and/or incorporated within the electrically conductive mat to form a composite layer. In such embodiments the electrically conductive mat, through the fabrication of composite layers, allows for an efficient process in fabricating energy storage devices. For example, the composite layers can be pre-made and stored, and then assembled into an electrode or device at the appropriate time.

The use of an electrically conductive mat in the form of a carbon fibre non woven sheet in an electrical storage device has been shown to enable a maximum cycle number (typically between about 6000 and 8000 cycles) to be reached at lower compression forces in comparison to that for conventional electrodes or hybrid/composite electrodes not having an electrically conductive mat, for example less than 70 kPa as opposed to above 80 kPa. In an embodiment, the electrically conductive mat is used in a hybrid or composite electrode (i.e. electrodes comprising both high-rate capacitor material and high-energy battery material) where electrical storage devices operate under a compression force of less than about 70 kPa, less than about 60 kPa, and preferably between about 30 and 60 kPa. It will be appreciated that compressive forces outside these ranges may still be employed.

Electrical Storage Devices

The electrical storage device includes at least one positive and negative electrode pair, wherein at least one electrode is an electrode according to the first aspect described herein.

The electrical storage device, for example a lead-acid battery, is typically assembled with an anode and cathode (or negative and positive electrode). In relation to lead-acid batteries, the device would typically comprise at least one lead dioxide based positive electrode, a porous non-conductive separator and at least one sponge lead based negative electrode coupled together in an electrolyte solution comprising sulphuric acid. The electrical storage device can be a valve regulated device.

The high-rate and high-energy materials can be deposited on the current collector in various ways, for example, in superimposed layers (which may or may not comprise an intervening layer e.g. electrically conductive mat), adjacent layers, or intermixed with each other, or as one material coating particles of the other material to form a mixture deposited on the current collector. The electrically conductive mat is arranged to provide a physical or mechanical support for the high-rate and/or high-energy materials. Advantageously, the electrically conductive mat can enable a substantially even layer of high-rate and/or high-energy electroactive material to deposited thereon and/or incorporated therein, and can facilitate efficient manufacturing of such electrodes.

The electrical storage device can comprise one or more negative electrode, positive electrode, or positive and negative electrode pair as described herein. The active electrochemical potential range of the high-energy and high-rate electroactive materials on a given electrode should overlap the entire desired operating range of that electrode. The high-energy and high-rate electroactive materials must also have access to an electrolyte which can supply counter ions and complete the electrical circuit in the energy storage cell. Chemical compatibility must also be considered, for example, if the two materials share a common electrolyte, they both must be stable in that electrolyte.

The high-rate and high-energy electroactive materials are typically arranged on the same current collector such that they are in electrical contact. Examples of this arrangement include: dual sided, dispersed, layered, side-by-side, and coated powders. Providing distinct phases of the different materials enables better predictability in the performance of the electrode. Other examples include regions that are side-by-side in a single plane such as interlaced regions of the two materials in a checkerboard format of equivalent shapes or alternating stripes of each material.

The negative electrode of the electrical storage device can comprise a high-energy electroactive material selected from one or more of the group consisting of cadmium, metal hydrides, lead and zinc. In one embodiment, the high-energy electroactive material is lead.

The positive electrode of the electrical storage device can comprise a high-energy electroactive material selected from one or more of the group consisting of nickel oxide, lead oxide and silver. In one embodiment, the high-energy electroactive material is lead dioxide.

In one embodiment, the positive electrode is a lead dioxide positive electrode and the negative electrode is a sponge lead negative electrode. The electrolyte is preferably a sulphuric acid electrolyte solution.

In one embodiment, the electrical storage device comprises at least one lead dioxide based positive electrode and at least one sponge lead based negative electrode in a sulphuric acid electrolyte solution, wherein the negative electrode comprises:
  a current collector;
  a first layer deposited on the current collector, the first layer comprising sponge lead;
  a second layer in contact with the first layer, the second layer comprising an electrically conductive mat comprising a network of interconnected electrically conductive carbon fibres;
  a third layer deposited on the second layer, the third layer comprising a second electroactive material,
wherein the sponge lead has a higher energy density than the second electroactive material, and the second electroactive material has a higher rate capability than the sponge lead. The electrical storage device typically further comprises a porous con-conductive separator separating the at least one lead dioxide based positive electrode and the least one sponge lead based negative electrode. In some embodiments, the second layer separates the first and third layers.

The electrical storage devices may by in the form of non-aqueous or aqueous systems. Non-aqueous systems are typically based on lithium ion. Aqueous systems may be acidic, neutral or basic. Both systems may use electrolytes which are solid, liquid, or gels and both systems may use conventional separators soaked with appropriate liquid electrolyte. Aqueous electrolyte systems generally use acidic, neutral or basic electrolytes, and may include mixed ion electrolytes.

The high-rate and high-energy electroactive materials can be fabricated onto the same electrode using one of the arrangements described above. It is important to note that the relative amounts or loadings of high-rate and high-energy electroactive materials will effect the ultimate performance of the electrical storage device. If the application requires peak power for relatively long times, then the loading of the high-rate electroactive material should be increased. If pulse duration is relatively short or requires less current, the high-rate electroactive material loading may be decreased.

It will also be appreciated that in one embodiment the battery may comprise an alternating series of positive and negative electrodes, with an electrolyte in contact with the electrodes, and a first conductor for directly connecting the positive electrodes and a second conductor for directly connecting the negative electrodes, wherein at least one pair of the adjacent positive and negative electrode regions form a capacitor (by storing capacitive energy), and at least one pair of adjacent positive and negative electrode regions form a battery (by storing energy as electrochemical potential between the two electrode pairs).

The above embodiments of the electrical storage devices can reduce or prevent sulphation problems in devices having such problems, for example high performance lead-acid batteries operated under high-rate partial state-of-charge. In one embodiment, there is provided a use of the electrical storage devices according to the embodiments described above under partial state-of-charge conditions (PSoC) in the range of about 20-100% (e.g. typical for electric vehicles), in the range of about 40-60% (e.g typical for hybrid electric vehicles), or in the range of about 70-90% (e.g. typical for mild hybrid electric vehicles).

Electrolyte

It will be appreciated that different electrolyte systems will usually be required for different types of batteries and energy storage devices. In the case of lead-acid batteries, any suitable acid electrolyte may be used. The electrolyte may be in the form of a liquid or a gel. For lead-acid batteries, the electrolyte is typically a sulphuric acid electrolyte. In the case of other battery types, the electrolyte may be an aqueous or organic electrolyte, including alkalis such as potassium and other hydroxides, lithium-ion containing organic solvents, polymer electrolytes, ionic liquid electrolytes in liquid or solid state and so forth. Suitable electrolytes for the chosen battery positive and negative electrode materials can be routinely selected by a person skilled in the art.

Busbars or Conductors

The busbar of a lead-acid battery may be of any suitable construction, and may be made from any suitable conductive material known in the art. The term "connected to" used in the context of busbars refers to electrical connection, although direct physical contact is preferred. In the case where the battery is not of a typical lead-acid battery configuration with busbars, any conductor may be used and configuration and materials will be well known in the art.

Other Battery Features

Generally, the components of the battery will be contained within a battery case with further features appropriate to the type of battery employed. For example, in the case of lead-acid batteries, the lead-acid battery may be either of a flooded-electrolyte design or of a valve-regulated design. Where the lead-acid battery is a valve-regulated lead-acid battery, the battery may be of any suitable design, and may for instance contain gel electrolyte. Specific features of the battery unit appropriate to such designs are well known in the art of the invention.

The pressure that may be applied to the lead-acid battery may lie in the range of 5-20 kPa for flooded electrolyte design, and from 20–80 kPa for valve regulated lead-acid battery design.

Separators

Generally, each of the positive and negative electrodes is separated from adjacent electrodes by porous separators. The separators maintain an appropriate separation distance between adjacent electrodes. Separators located between immediately adjacent lead-based negative electrodes and lead dioxide-based positive electrodes may be made from any suitable porous material commonly used in the art, such as porous polymer materials or absorptive glass microfibre ("AGM"). The separation distance (corresponding to separator thickness) is generally from 1-2.5 millimeters for these separators. Suitable polymer materials useful for forming the separators between the positive and negative electrodes forming the battery part are polyethylene and AGM. Polyethylene separators are suitably between 1 and 1.5 millimeters thick, whereas AGM separators are appropriately between 1.2 and 2.5 millimeters thick.

In the case of separators located between the positive electrode and the capacitor negative electrode, these are suitably much thinner than the separators of the battery part of the lead-acid battery. Advantageously, the separators are between 0.01 and 0.1 millimeters thick, and more preferably between 0.03 and 0.07 millimeters thick. These separators are suitably made from microporous polymer material such as microporous polypropylene. Other separators are AGM and the thickness of this type of separators is between 0.1 and 1 millimeters, and preferably between 0.1 and 0.5 millimeters.

Formation of Lead-Acid Batteries

After assembling of the appropriate components together in a battery case, the lead-acid battery generally needs to be formed. The formation operation is well known in the field. It is to be understood that the references to "lead-based" and "lead dioxide-based" materials are used to refer to lead or lead dioxide itself, materials containing the metal/metal dioxide or to materials that are converted into lead or lead dioxide, as the case may be, at the given electrode.

As is indicated by the language used above, the lead-acid battery contains at least one of each type of electrode. The number of individual cells (made up of a negative and positive plate) in the battery depends on the desired voltage of each battery. For a 36-volt battery appropriate for use as a mild hybrid electric vehicle battery (which may be charged up to 42 volt), this would involve the use of 18 cells.

Electrode Arrangement

Generally the positive and negative electrodes are interleaved, so that each positive electrode has one negative electrode to one side of it. However, it will be appreciated that other electrode arrangements may be utilised depending on the application envisaged.

Operation

An electrode comprising high-rate capacitor material will have a lower internal resistance than an electrode comprising high-energy battery material only, and therefore the electrode with high-rate capacitor material will absorb and release charge during high-rate charging (for generative braking) or during high-rate discharge (vehicle acceleration and engine cranking) before an electrode comprising high-energy battery material only. An electrode comprising high-energy battery material enables high performance properties and will provide a lead-acid battery with significantly longer life. The electrodes comprising both high-energy battery material and high-rate capacitor material provide a simple and effective design that enables high-rate performance along with high-energy properties commonly associated with lead-acid batteries.

In relation to lead-acid batteries, lead sulphate formation can occur on an electrode surface during high-current charging and discharging of the battery, which according to an embodiment of the present invention can be minimised by using a high-rate electroactive material in combination with an electrically conducting mat.

Each battery cell or electrode pair may provide a voltage of 2-volts. A lead-acid battery of one embodiment suitable for use in the broad range of electric vehicle battery applications may contain 8 negative electrodes and 9 positive electrodes, with 4 of the negative electrodes being lead-based negative electrodes. Variations in this arrangement and relative numbers of electrodes are also suitable, provided that there is a minimum of one of each electrode.

Particular Additives for Electrodes

If there is a mismatch in the potential window or potential operational range of one of the electrodes, hydrogen and/or oxygen gassing may occur. To suppress hydrogen gassing, the electrodes can include an additive or additive mixture comprising an oxide, hydroxide or sulfate of lead, zinc, cadmium, silver and bismuth, or a mixture thereof. Generally, it is preferred that the additive includes at least one oxide, hydroxide or sulfate of lead or zinc. For convenience, the additive is suitably one or more oxides selected from lead oxide, zinc oxide, cadmium oxide, silver oxide and bismuth oxide. An electrode may comprise the additive in addition to the high-rate capacitor material and/or high-energy battery material. Due to toxicity reasons, cadmium compounds are not preferred, and therefore the composition preferably comprises a lead compound and/or zinc compound, and optionally a silver compound. For cost reasons, silver oxide and bismuth oxide would usually be avoided.

Irrespective of the form in which the additive is added, on contact with the electrolyte (e.g. sulfuric acid) the additive may react and be converted into another metal compound derived from the original metal oxide, sulfate or hydroxide. References to the oxides, sulfates and hydroxides of the subject additives are to be read as encompassing the products of the reactions between the additives and the electrolyte. Similarly, if during the charged or discharged state of the electrical storage device the additive is converted into another form through redox reactions, the references to the oxides, sulfates and hydroxides are to be read as encompassing the products of the redox reactions on these additives.

In one embodiment, the additive comprises: $Pb_2O_3$ ("red lead"); an oxide, hydroxide or sulfate of antimony; and optionally one or more additives selected from oxides, hydroxides and sulfates of iron and lead.

The compound of antimony is beneficial in suppressing (oxygen) gassing at the positive electrode. However, if it migrates to the negative electrode, it produces an adverse effect on hydrogen gassing at that electrode. In the absence of an agent to fix the antimony compound to the positive electrode, when the antimony compound comes into contact with the electrolyte, it may dissolve in the electrolyte, and be deposited on the negative electrode when a current is applied. The red lead is used to fix or prevent transfer of the antimony to the negative electrode. Compounds (i.e. oxides, sulfates or hydroxides) of lead and iron are also advantageous, and may also be used in the additive mixture.

In each case, the additive is used in amount to avoid hydrogen and oxygen gassing. This is generally an amount that increases the potential window of the capacitor negative and positive electrode from the typical ±0.9V or ±1.0V to at least ±1.2V, and preferably at least ±1.3V. In general terms, the total oxide content may be between 5-40 wt %, based on the total active material composition (including high-rate or high-energy material, binder, and any other component in the dried paste composition).

A negative electrode additive may comprise between 1-40 wt % Pb compound (more preferably 1-20%), 1-20 wt % Zn compound (more preferably 1-10%), 0-5 wt % Cd compound and 0-5 wt % Ag compound. Preferably the total is within the 5-40 wt % range mentioned above. The use of ZnO additive alone provides good results, as does PbO alone, or a mixture of PbO and ZnO.

A positive electrode additive may comprise between 0-30 wt % Pb in oxide, sulfate or hydroxide form, 1-10 wt % $Pb_2O_3$, 0-2 wt % Fe in oxide, sulfate or hydroxide form and 0.05 to 1 wt % Sb in oxide, sulfate or hydroxide form. Preferably Sb is added as an oxide. Preferably the total is within 5-40 wt % range mentioned above.

Additives for electrodes for lead-acid batteries may be provided as discussed above to avoid hydrogen gassing. Additives may be included for other battery types including nickel rechargeable batteries, lithium metal or lithium ion rechargeable batteries, and so forth. Suitable battery-type positive electrode materials may include nickel oxide, silver oxide, manganese oxide, lithium polymer materials, mixed lithium oxides including lithium nickel oxides, lithium cobalt oxides, lithium manganese oxides and lithium vanadium oxides, and lithium conductive polymer cathode materials. Suitable battery-type negative electrode materials may include zinc, cadium, metal hydrides, lithium in metal or alloy form with other metals such as aluminium, and lithium ion intercalation materials. The details of, and alternatives for, these electrode materials used in various battery types can be gathered from various publications in the art of the invention.

Fabrication Process

A process for fabricating an electrode as described herein can comprise forming a composite layer comprising at least one of the first electroactive material and the second electroactive material deposited on and/or incorporated within the electrically conductive mat; and coupling the composite layer to the current collector.

The current collector being coupled may include a deposit, layer or coating of the first electroactive material, the second electroactive material, other additives or additive mixtures, other electrode materials, or combinations thereof. The process can further comprise forming a coating of the first electroactive material on the current collector, and coupling the composite layer to the coating of the first electroactive material on the current collector.

Figure 13:
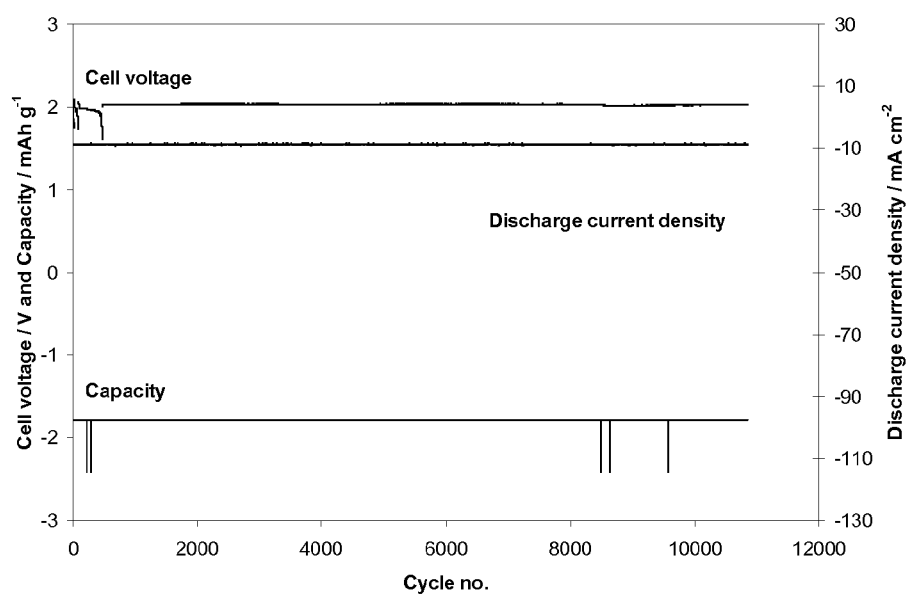
FIG. 13 is a graph showing the changes in cell voltage and capacity for a high current charge/discharge protocol for cell comprising capacitor composition pasted directly onto the lead sheet of the cell where capacitor composition comprises 20 wt % lead oxide, 20 wt % carbon black and 35 wt % activated carbon.

The first electroactive material, the second electroactive material and the electrically conductive mat, accord with the various embodiments for these features as described herein. A composite layer, such as an electrically conductive mat coated with a high-rate electroactive material electrode material, can be formed in a layered sheet that allows it to be cut to a predetermined size during processing (FIG. 13).

Figure 14:
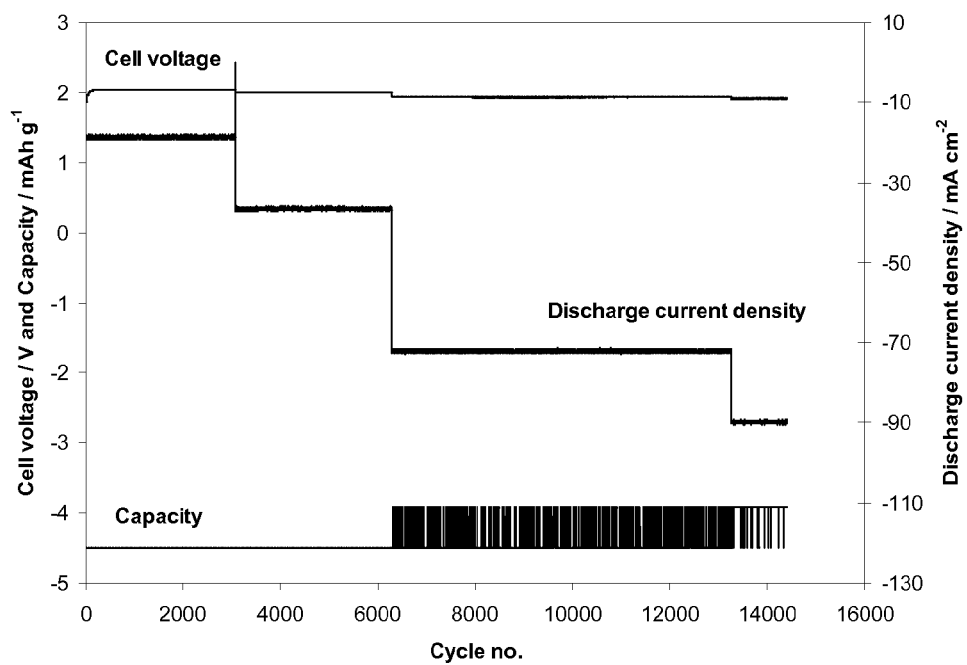
FIG. 14 is a graph showing the changes in cell voltage and capacity for a high current charge/discharge protocol for cell comprising capacitor composition pasted directly onto the lead sheet of the cell where capacitor composition comprises 20 wt % lead oxide, 20 wt % carbon black and 45 wt % activated carbon.

With respect to processing and fabrication of an electrode or device, the electrically conductive mat provides a number of advantages. For example, composite layers comprising the electrically conductive mat can be pre-made and stored, and then assembled into the electrode or device at the appropriate time, which provides certain efficiencies in the fabrication of such electrodes and devices. For example, a composite layer may be applied, simultaneously, to each side of a doubled sided electrode to provide for an efficient manufacturing process for such an electrode (FIG. 14).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

EXPERIMENTAL

1. Preparation of Negative and Positive Electrodes

High-energy electroactive material for the negative electrode was formed into a paste by mixing leady oxide, carbon black, plastic fibres, expander and sulphuric acid solution. This was then pasted onto a lead alloy grid having the following dimensions: thickness: 1.7 mm, height: 75 mm and width: 75 mm.

High-energy electroactive material for the positive electrode was formed into a paste by mixing leady oxide, plastic fibres and sulphuric acid solution, but without the expander. This was then pasted onto the same type of grids as used for the negative electrodes.

The electrodes were cured and dried and then assembled into a cell. The negative electrode was sandwiched between two positive electrodes and separated with polymer separators. The cell was then added with 1.07 sg sulphuric acid. The electrodes underwent formation to convert the high-energy electroactive material of the positive electrode into lead dioxide ($PbO_2$) and the high-energy electroactive material of the negative electrode into sponge lead. After formation, the electrodes were then washed with water and dried.

Figure 1B:
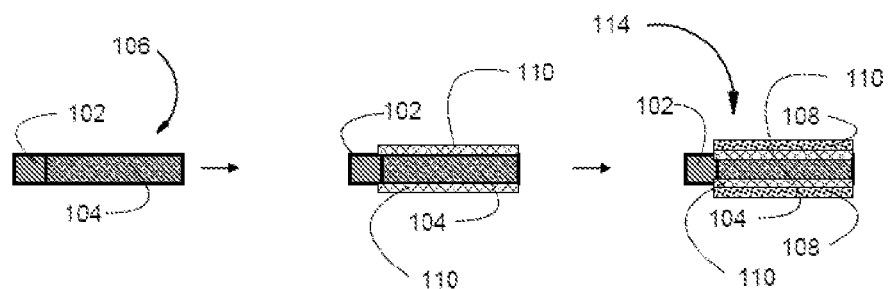

FIGS. 1a and 1b show a stepwise process for achieving two types of arrangements on an electrode (112 and 114) involving the application of an electrically conductive mat and high-rate electroactive material to a current collector already coated with high-energy electroactive material. As shown in FIG. 1a, a current collector (102) is coated with a high-energy electroactive lead material (104) to provide a formed negative electrode (106) (i.e. a current collector already comprising high-energy electroactive material). Both sides of the formed negative electrode (106) can each be covered with an electrically conductive mat in the form of a carbon fibre non-woven sheet (108). The high-rate electroactive material (110) can then be pasted onto the carbon fibre sheets to form an electrode comprising both high-energy and high-rate electroactive material (112) providing high-energy and high-rate capability, which may also be referred to generally as a "hybrid" or "composite" electrode. The high-rate electroactive material used was activated carbon, which preferably has a surface area of about 2000 $m^2$/g and is prepared in the form of a paste by using a neoprene and carboxymethylcellulose binding mixture. For example, a capacitor paste material may comprise 85% activated carbon and 15% binding mixture. An alternative arrangement of this hybrid electrode is shown in FIG. 1b, where the high-rate capacitor material (110) can be initially coated onto the formed negative electrode (106) (i.e. an electrode already comprising a coating of high-energy electroactive material) and then covered with a carbon fibre sheet (108). In the present arrangement, the current collectors for the electrodes were formed from flat lead grids and therefore the above process applied to each side of the flat grids. The composite electrodes were then dried at 80° C. for 1 h.

The paste composition for the high-energy electroactive material for the lead negative electrode comprised lead oxide (1 kg), fibre 0.8 g, $BaSO_4$ 15.0 g, carbon black 12 g, vanisperse 3 g, $H_2SO_4$ (1.36 rel.dens.) 86.6 ml, water 140 ml, acid-to-oxide ratio 5.5% and paste density 4.1 $g/cm^3$. The paste composition for the lead dioxide positive electrode comprised lead oxide 1 kg, fibre 0.8 g, $H_2SO_4$ (1.360 rel.dens.) 120 ml, water 90 ml, acid-to-oxide ratio 5.4% and paste density 4.2 g/ml. The lead oxide was converted into lead dioxide and lead by the formation techniques to form the negative electrode. It will be appreciated that vanisperse and $BaSO_4$ (known as an expander) facilitates porosity and dispersion of Pb and $PbSO_4$ by preventing large particle growth during operation.

The high-rate electroactive material was made from 45 wt % carbon black with specific surface area of 60 $m^2$/g, 4 wt % carboxymethyl cellulose, 11 wt % neoprene, and 35 wt % activated carbon with specific surface area of 1500 $m^2$ g-1 and 5 wt % plastic fibre.

Four types of cells were prepared wherein each cell had a different arrangement of negative electrode according to that described in Table 1 below.

TABLE 1

Test cells comprising different negative electrodes.

| Cell No. | Positive electrode/plate | Negative electrode/plate |
|---|---|---|
| 1 (control) | Conventional positive plate composition comprising a lead current collector coated with high-energy electroactive lead material. | Conventional negative plate composition comprising a lead current collector coated with high-energy electroactive lead material (i.e. without any high-rate electroactive capacitor coating). |
| 2 | As with cell 1. | Both sides of the negative plate for cell 1 coated with high-rate electroactive capacitor material. |
| 3 | As with cell 1. | Both sides of negative plate for cell 2 covered with carbon fibre nonwoven sheets. |
| 4 | As with cell 1. | Both sides of negative plate for cell 1 covered with carbon fibre nonwoven sheets and then coated with high-rate electroactive capacitor material. |

Cell 3 in Table 1 above therefore comprises a negative electrode formed according to the arrangement of the electrode (112) in FIG. 1a, and Cell 4 in Table 1 above comprises a negative electrode formed according to the arrangement of the electrode (114) in FIG. 1b.

Figure 2A:
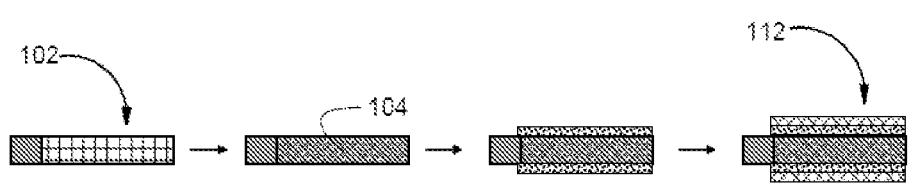
FIGS. 2a and 2b show a stepwise process for achieving two types of arrangements as shown in FIGS. 1a and 1b, respectively, involving a current collector formed from a lead alloy grid.
Figure 2B:
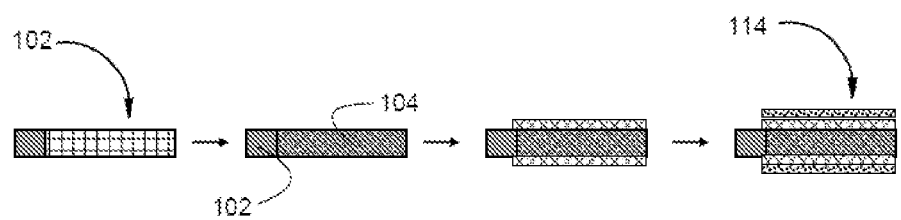

FIGS. 2a and 2b reiterate a stepwise process for achieving two types of arrangements as shown in FIGS. 1a and 1b, respectively, although the stepwise process starts with a current collector formed from a lead alloy grid (102). The features as described above for FIGS. 1a and 1b apply respectively to that of the other features provided in FIGS. 2a and 2b.

The hybrid or composite electrodes are then cured and dried. The dried composite negative electrodes and the positive counterparts, together with separator were assembled into a cell container and the container was filled with sulphuric acid solution. A given current was applied for a given time to convert the lead oxide, basic lead sulphate and lead sulphate to lead dioxide at the positive electrodes and sponge lead at the negative electrodes.

The electrically conductive mat used was a carbon fibre sheet (non-woven), which was a commercial product supplied by Hollingsworth and Vose, USA, having the following properties:

Basic weight: 10 g/m2

Thickness: 0.063 mm

MD tensile: 0.91 kN/m

CD tensile: 0.52 kN/m

Surface resistivity: 6.5 DC $\Omega/m^2$

The carbon fibre sheet used is preferably thin, with the two particular advantages of providing a partially ordered structure ensuring good electron conductance along the fibres, and a nearly stationary spatial fixing of the fibres ensuring good contact between them. As with other carbon materials, the sheet has low internal resistance which is an ideal characteristic required for use in an electrochemical capacitor. The sheet helps to maintain the structure of the high-rate electroactive material which has been identified to partially shed during cycling, and this can be reduced or prevented when the high-rate electroactive material is deposited on and/or incorporated into the carbon fibre sheet.

2. Performance Results of Electrode Configurations of Cells 1-4

Figure 3:
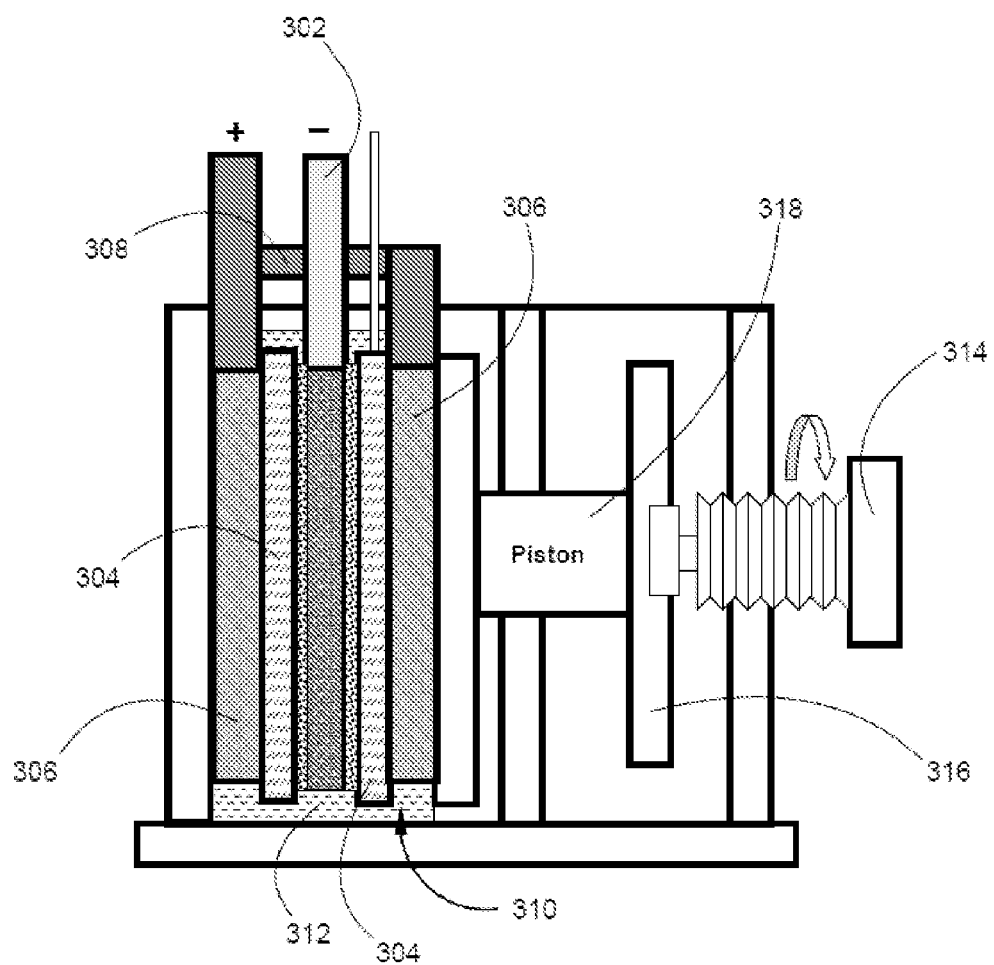
FIG. 3 shows testing equipment and an arrangement used to determine the cycling performance of electrodes under a range of compressions when incorporated into a working cell.

FIG. 3 shows the experimental apparatus used to test the performance of Cells 1-4 (Table 1). The negative electrodes (302) were covered with a polymer/glass mat separator (304) and placed between two positive electrodes (306). The two positive electrodes were connected by a pure lead tab (308). The electrodes, together with the separators, were then placed into a plastic bag (not shown) and the whole assembly was placed into the cell container (310). A 1.30 sg sulphuric acid solution (312) was then poured into the plastic bag. A silver/silver sulphate reference electrode (313) was inserted into the plastic bag for measuring the potential of the positive and negative electrodes during test. After soaking the electrodes for 30 min, the cell was fully charged and the 1 hour capacity was determined. After capacity determination, the cell was subjected to cycling tests under different cell compressions. The required compression force was achieved by turning the bolt (314) clockwise which pushed the load cell (316) and the piston (318) against the cell group to provide a desired compressive value. The cycling performance of Cells 1-4 (Table 1) were evaluated under wide ranges of compression forces, e.g. 10 to 90 kPa.

Figure 4:
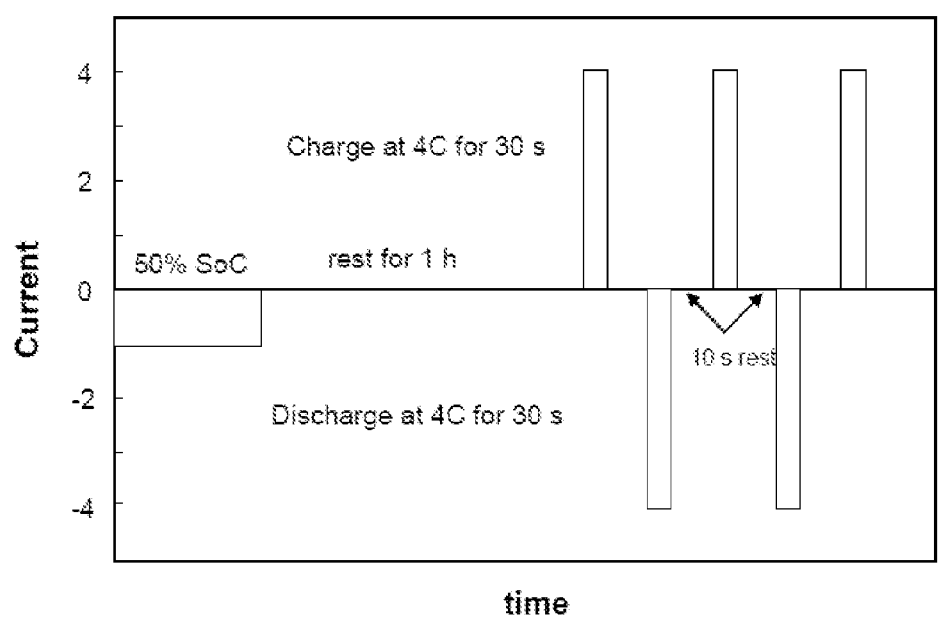
FIG. 4 shows the testing profile involving the charging and discharging sequence used with the testing equipment and arrangement according to FIG. 3.

FIG. 4 shows the testing profile involving charging and discharging sequence used with the testing equipment and arrangement according to FIG. 3 as described above under Experimental Apparatus. The test profile is shown in FIG. 4. The test procedure was:
(i) Discharge at a current of C A to 50% SoC (C=1–h capacity of the cell);
(ii) Allow the cell to stand at open-circuit for 1 hour (rest time);
(iii) Charge the cell at a constant voltage of 2.45 V with a maximum current of 4C A for 30 to 33 s (note, the variation in charge time is due to maintaining the equal amount of charge input during this charging step and charge output during the discharging step v);
(iv) Allow the cell to stand at open-circuit for 10 s;
(v) Discharge the cell at a current of 4C A for 30 s;
(vi) Allow the cell to stand at open-circuit for 10 s;
(vii) Repeat step (iii) to step (vi) until the cell voltage reaches the cut-off value of 1.83 V during discharging step.

Figure 5:
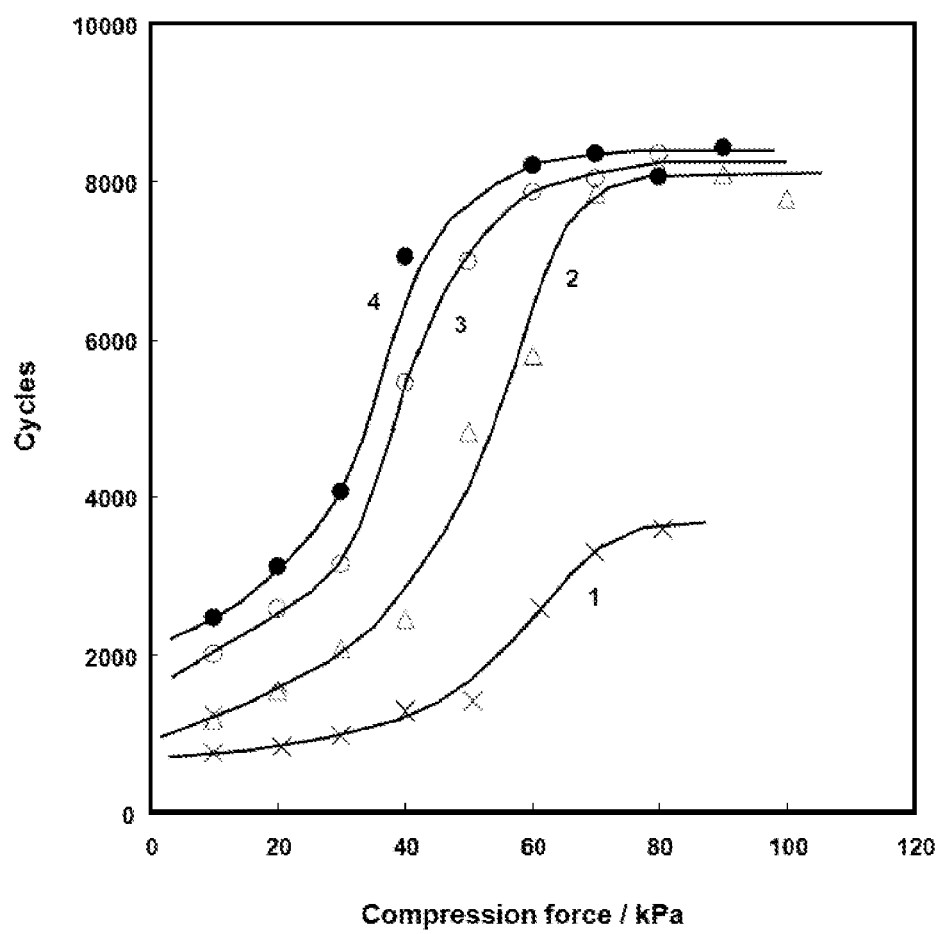
FIG. 5 is a graph showing the cycling performance under different compression forces of a range of four cells made from different negative electrodes according to various embodiments of the present invention.
Figure 6:
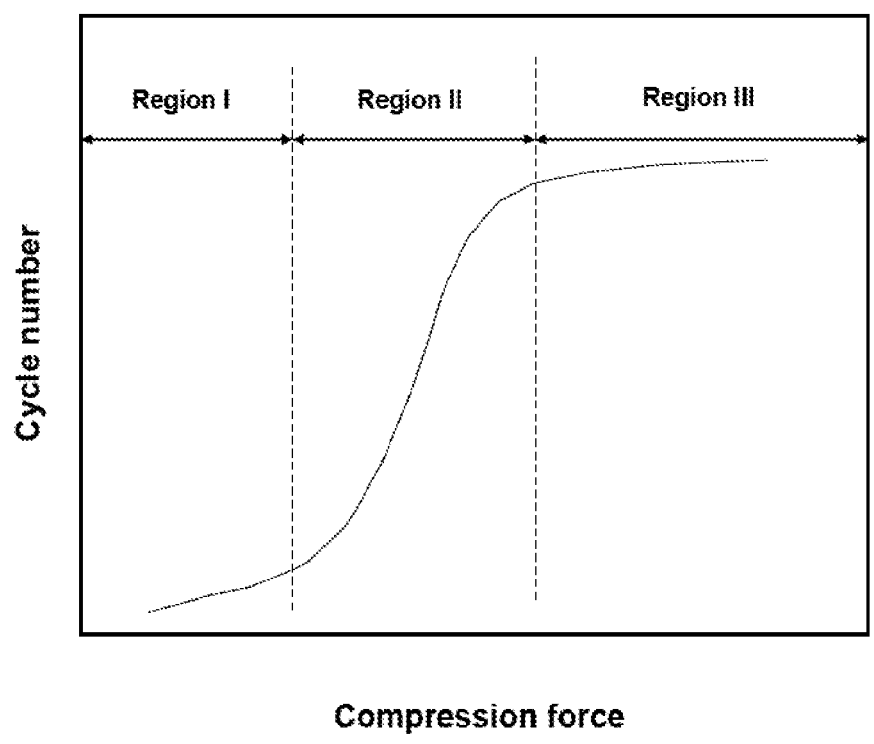
FIG. 6 is a graph showing the general relationship between cycle number and cell compression force for electrodes tested.

FIG. 5 is a graph showing the cycling performance under different compression forces for Cells 1-4 (Table 1) directed to four different electrode configurations. For a given type of cell, in general, the increase of cycle number with the increase of compression force displays three regions with different rates of increase, namely regions I, II and III. The change in cycle number with the increase of compression force can be illustrated schematically in FIG. 6. The increase in cycle number with cell compression force is slow in region I where the cell compression force is still low. The cycle number starts to increase when the compression force reaches a certain value (region II). Finally, the increase in cycle number slows down and becomes virtually unchanged when the compression force is beyond a certain value.

In region I, there is a slow increase of cycle number with the increase in compression force similar for all Cells 1-4. With reference to FIG. 5, Cell 1 (formed negative plate without high-rate electroactive material coating or electrically conductive mat) is shown by curve "1", Cell 2 (formed negative plate coated with high-rate electroactive material but without any carbon fibre sheet) is shown in curve 2, Cell 3 (formed negative plate coated with high-rate electroactive capacitor material and then covered with a carbon fibre sheet) is shown by curve "3", and Cell 4 (formed negative plate covered with a carbon fibre sheet and then coated with capacitor material) is shown by curve "4". The reference to "formed negative plate" means a current collector coated with a high-energy electroactive material, which in the present testing was a lead based material convertible into a lead dioxide based material. The increase in cycle number between each cell was shown to be in the order: Cell 1<Cell 2<Cell 3≤Cell 4.

In region II, the increase in cycle number with the increase of compression force in each cell becomes quicker compared with that in region I and the increase in cycle number between cells follow the order: Cell 1<Cell 2<Cell 3≤Cell 4.

In region III, the final level of the cycle number is higher for cells in the following order: Cell 1<Cell 2≈Cell 3≈Cell 4.

In conclusion, Cell 3 and Cell 4 show a faster increase in cycle number than Cell 1 and Cell 2 and both these cells reach the maximum level of cycle number when the compression force is greater than 60 kPa. On the other hand, Cell 1 and Cell 2 reach their corresponding maximum cycle number when the compression forces are greater than 80 and 70 kPa, respectively. This indicates that the addition of the carbon fibre non woven sheet assists Cells 3 and 4 to reach the maximum cycle number faster than Cells 1 and 2 even at the lower compression force, e.g. 60 kPa.

3. Function of Electrically Conductive Mat

The next step involved experiments (FIGS. 7-10) to find out whether or not the addition of a carbon fibre nonwoven sheet facilitated: to (i) hold high-rate electroactive capacitor material together and therefore to increase the conductivity as well as the mechanical strength of the capacitor layer; (ii) to provide additional energy and power to the capacitor layer; (iii) both to increase conductivity and mechanical strength of the capacitor layer and to provide additional energy and power.

The carbon fibre non woven sheet was cut to the shape with height (75 mm) and width (75 mm) similar to that of the lead-alloy grids used for positive lead-acid electrodes, but with different thickness (e.g., 0.5 mm for carbon fibre non woven sheet vs. 1.7 mm for positive lead-alloy grid). The carbon fibre non woven sheet was covered with a glass mat separator and sandwiched in between two positive lead-acid (high-energy) electrodes. The two positive electrodes were connected by a pure lead tab. The electrodes, together with the separators, were then placed into a plastic bag and the whole assembly was placed into the cell container. A 1.30 sg sulphuric acid solution was then poured into the plastic bag. After soaking the electrodes for 30 min, the cell was subjected to the following profile:
(i) Charge the cell at a constant voltage (2.45 V) with a maximum current of 0.02 A for 20 s;
(ii) Allow the cell to stand at open-circuit for 10 s;
(iii) Discharge the cell at a current of 0.02 A until the cell voltage reaches a cut-off value of 1 V;
(iv) Allow the cell to stand at open-circuit for 10 s;
(v) Recharge the cell at a constant voltage of 2.45 V with a maximum current of 0.02 A for 20 s;
(vi) Allow the cell to stand at open-circuit for 10 s;
(vii) Repeat step (iii) to step (vi) for 10 times.

Figure 7:
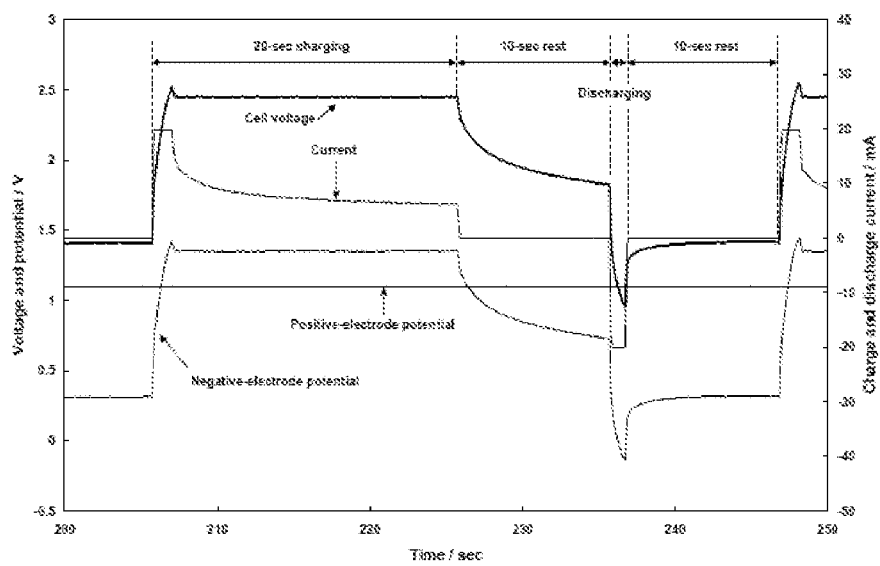
FIG. 7 is a graph showing the charging and discharging profile involved for testing carbon fibre non-woven sheets, including changes in cell voltage, positive-electrode potential and negative-electrode potential during charge and discharge at 20 mA in one cycle.
Figure 8:
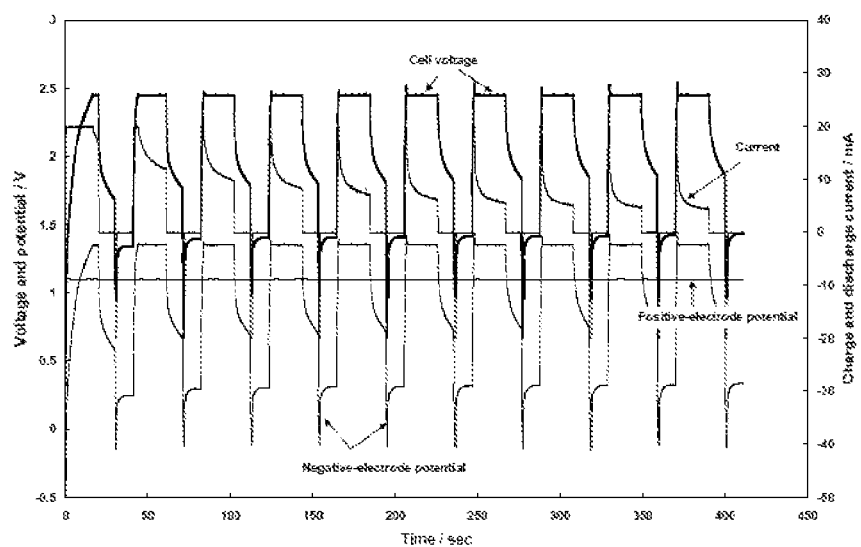
FIG. 8 is a graph showing the changes in cell voltage and negative-electrode potential with time for a set of 10 cycles involved with testing the carbon fibre non-woven sheets.

FIG. 7 shows the changes in cell voltage, positive-electrode potential and negative-electrode potential during charge and discharge at 20 mA in one cycle. FIG. 8 shows the changes in cell voltage and negative-electrode potential with time for a set of 10 cycles. It is clear that the cell voltage and negative-electrode potential drop rapidly to 1 V and −0.1 V within 1.0 sec. Consequently, the discharge capacity of the carbon fibre nonwoven sheet is very small, namely about 0.005 to 0.013 mAh. The weight of carbon fibre nonwoven sheet is 0.38 g and therefore, the specific capacity is 0.013 to 0.034 mAh per gram.

Figure 9:
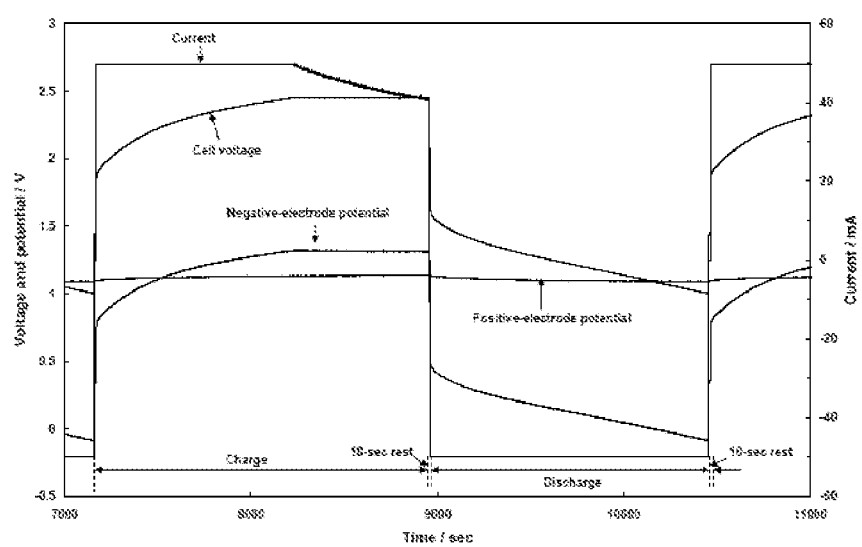
FIG. 9 is a graph showing the changes in cell voltage, positive-electrode potential and negative-electrode potential during charge and discharge at 50 mA in one cycle involved with testing the carbon fibre non-woven sheets.
Figure 10:
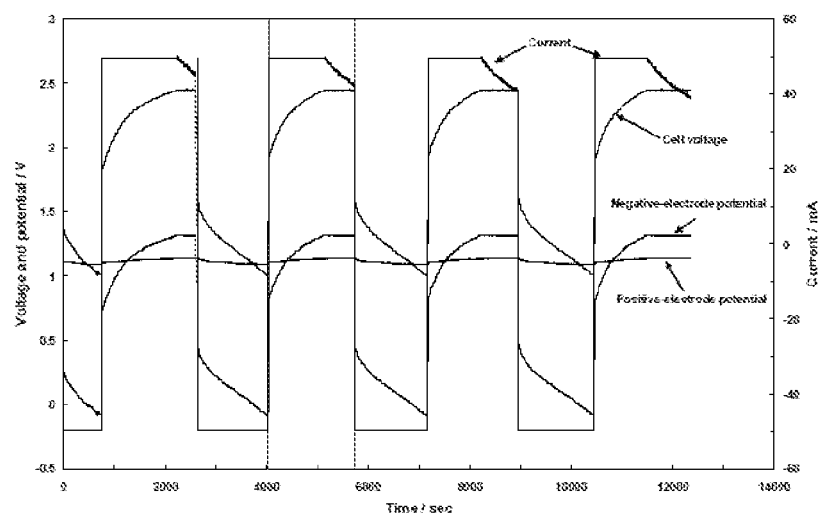
FIG. 10 is a graph showing the changes in cell voltage and negative-electrode potential with time for a set of 4 cycles involved with testing the carbon fibre non-woven sheet.

FIG. 9 shows the changes in cell voltage, positive-electrode potential and negative-electrode potential during discharge and charge at 50 mA in one cycle (note, the amount of charge input during the subsequent charging step is 20% greater than that of the previous discharge step). FIG. 10 shows the changes in cell voltage and negative-electrode potential with time for a set of 4 cycles. Unlike the bare carbon fibre non woven sheet, the capacitor material coated carbon fibre non woven sheet gives much longer discharge time and therefore, much higher capacity, namely 20-25 mAh vs. 0.005-0.01 mAh. The weight of the capacitor material coated carbon fibre sheet is 1.92 g and therefore, the specific capacity of the capacitor coated carbon fibre sheet compared with that of the bare sheet is 10.417 to 13.021 mAh per gram vs. 0.013 to 0.034 mAh per gram. This indicates that the carbon fibre non woven sheet is added to increase both the mechanical strength and the conductivity of the capacitor layer, not to provide additional energy or power.

The following experiment was set up to find out whether or not, during pasting, the high-rate electroactive capacitor material could pass through the pores of the carbon fibre non woven sheet and contact an adjacent surface of a lead-acid negative plate. The high-rate electroactive capacitor material was prepared by mixing the carbon black, activated carbon, binder and water. The capacitor paste was then applied onto the middle area of the carbon fibre nonwoven sheet, which was placed on a white paper. It was seen that depending on the porosity of carbon fibre nonwoven sheet, the capacitor material may or may not transfer through to an adjacent surface. This indicates that the use of carbon fibre nonwoven sheets can be specified having a porosity that prevents the high-rate electroactive capacitor material or paste thereof from permeating or moving through the carbon fibre sheet to an opposing surface.

4. Performance of High-Rate Electroactive Material

The next step involved experiments to find out the optimum composition of the high rate electroactive (capacitor) material. Four types of capacitor compositions were prepared as shown in Table 2 and were coated onto four carbon fibre nonwoven sheets, which have same property and were obtained from Hollingsworth and Vose company. The carbon sheet was cut to shape with height of 75 mm and width of 75 mm similar to that of the positive lead-acid electrode.

TABLE 2

Test cells comprising different capacitor electrodes

| Type | Carbon fibre nonwoven sheet[1] | Capacitor composition[2] | Capacity at the 10th cycle[3] (mAh per gram of capacitor material) |
|---|---|---|---|
| 1 | 8000030 (1-inch) | Carbon black 45 wt % Activated carbon 35% | 49 |
| 2 | 8000030 (1-inch) | Carbon black 20 wt % Activated carbon 60% | 64 |
| 3 | 8000030 (1-inch) | Carbon black 10 wt % Activated carbon 70% | 100 |
| 4 | 8000030 (1-inch) | Carbon black 0 wt % Activated carbon 85% | 110 |

Note:
[1] sample was obtained from Hollingsworth & Vose Company, USA.
[2] carboxymethyl cellulose 4 wt. %, neoprene 11 wt % and plastic fibre 5 wt % for types 1 to 3 and the plastic fibre was further removed for type 4.
[3] discharge at 50 mA.

Figure 11:
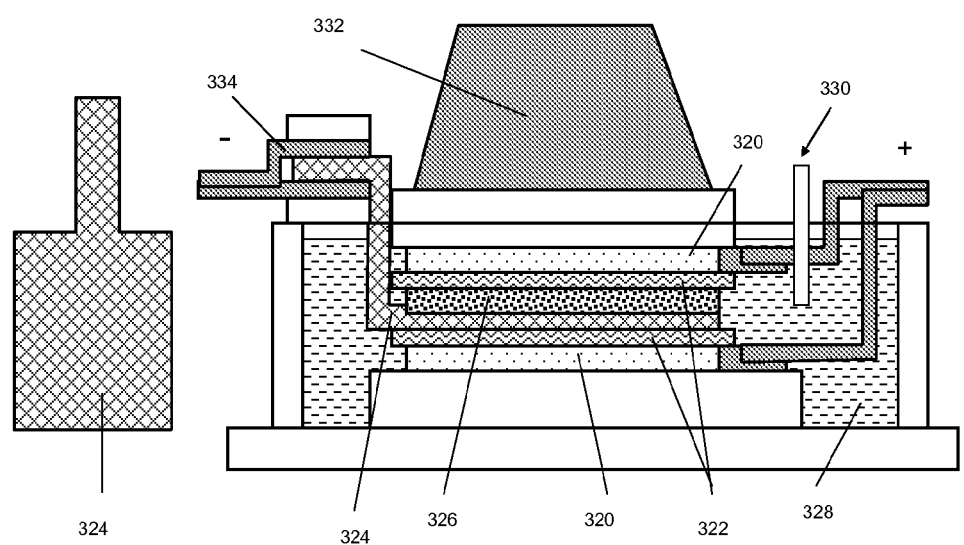
FIG. 11 shows a configuration of cell used to test variations in four different compositions of high-rate electroactive material according to various embodiments of the present invention.

The configuration of the system used to test cell Types 1-4 from Table 2 are shown in FIG. 11. The capacitor electrode comprised a carbon fibre nonwoven sheet (324) and capacitor material (326) and the carbon fibre nonwoven sheet acted as a current collector in this embodiment. The capacitor electrode was covered with a glass mat separator (322) and sandwiched in between two positive lead-acid (high energy) electrodes (320). For electrical contact, the tab of the carbon fibre non woven sheet was clipped by two lead metal sheets (334). The plate group was then put horizontally into a plastic container. A kg lead block (332) was loaded on the plastic sheet placed on the plate group to provide a compression force of 10 kPa as shown in FIG. 11. A 1.30 sg sulphuric acid solution (328) was poured into the cell container to the level slightly higher than the upper positive electrode and a silver/silver sulphate reference electrode (330) was inserted. After soaking the electrodes for 30 min, the cell was subjected to the following profile:

(i) Charge the cell at a constant voltage (2.45 V) with a maximum current of 0.02 A for 1 h;
(ii) Allow the cell to stand at open-circuit for 10 s;
(iii) Discharge the cell at a current of 0.05 A until the cell voltage reaches a cut-off value of 1 V;
(iv) Allow the cell to stand at open-circuit for 10 s;
(v) Recharge the cell at a constant voltage of 2.45 V with a maximum current of 0.05 A until an overcharge of 20% is reached;
(vi) Allow the cell to stand at open-circuit for 10 s;
(vii) Repeat step (iii) to step (vi) for 10 times.

The capacity at the 10th cycle is also given in Table 2. It shows that the capacity increases with the increase of activated carbon and the reduction, or even removal, of carbon black. This indicates that the carbon fibre non woven sheet has sufficient conductivity so that high-rate electroactive material does not require the addition of carbon black.

5. Performance of Electrically Conductive Mat

Experiments were also set up to find out the optimum carbon fibre non woven sheets. The above apparatus (see FIG. 11) and test procedure were used in this experiment. The same high-rate electroactive (capacitor) composition, i.e., carbon black 10 wt %, activated carbon 70 wt %, carboxymethyl cellulose 4 wt. %, neoprene 11 wt % and plastic fibre 5 wt %, was used and coated onto different types of carbon fibre non woven sheets, namely 8000018, 8000030 (1-inch), 8000030 (0.5-inch), 8000040, 8000154. These 20 carbon fibre nonwoven sheets have different properties and thicknesses. Results show that the 8000030 (1-inch), 8000030 (0.5-inch) and 8000040 carbon fibre nonwoven sheets give similar performance.

Figure 12:
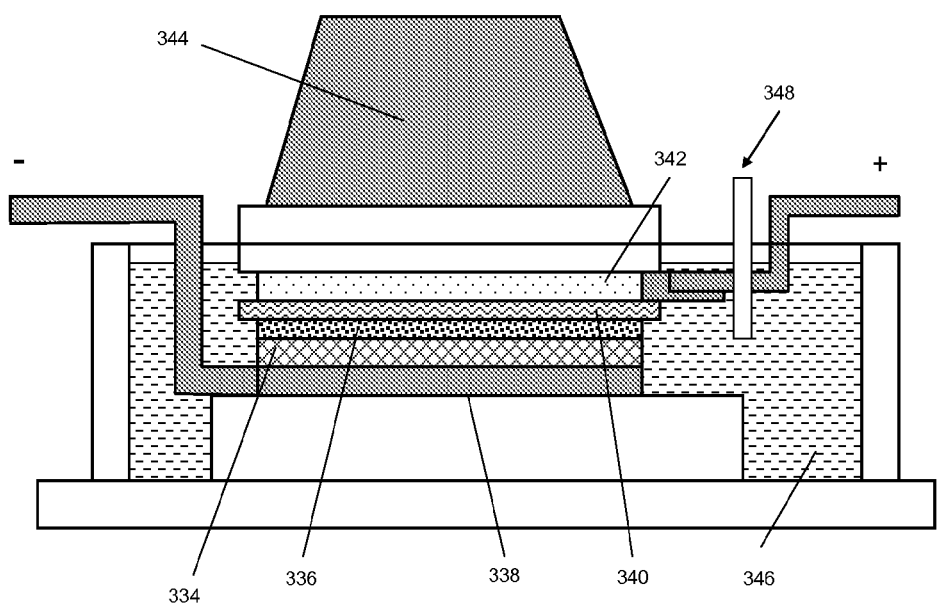
FIG. 12 shows a configuration of cell used to test variations in different electrically conductive mats according to various embodiments of the present invention.

The next experiment was set up to evaluate the above three carbon fibre sheets under higher discharge current (FIG. 12). The experimental apparatus was modified so that the cell was able to discharge and charge at higher rates. The carbon fibre nonwoven sheets and pure lead metal sheets (thickness=about 1 mm) were cut to the shape with height of 75 mm and width of 75 mm, which is similar to that of the lead-acid positive electrode. The three carbon fibre sheets were coated with the same high rate capacitor material composition of: activated carbon 85 wt %, carboxylmethyl cellulose 4 wt % and neoprene 11 wt % (Table 3). Each coated carbon fibre sheet, which comprised the carbon fibre nonwoven sheet (334) and capacitor material (336), was assembled with a lead metal sheet (338), a glass mat separator (340) and a positive lead-acid electrode (342) in a plastic container as shown in FIG. 12. Unlike the arrangement in FIG. 11, the lead metal sheet acted as the current collector, which allowed the current to flow to and from the capacitor layer. A 1.30 sg sulphuric acid solution was poured into the cell container to the level slightly higher than the upper positive electrode. After soaking the electrodes for 30 min, the cell was subjected to the following profile:
  (i) Charge the cell at a constant voltage (2.45 V) with a maximum current of 0.02 A for 1 h;
  (ii) Allow the cell to stand at open-circuit for 10 s;
  (iii) Discharge the cell at a current of 0.15 A until the cell voltage reaches a cut-off value of 1 V;
  (iv) Allow the cell to stand at open-circuit for 10 s;
  (v) Recharge the cell at a constant voltage of 2.45 V with a maximum current of 0.15 A until an overcharge of 20% is reached;
  (vi) Allow the cell to stand at open-circuit for 10 s;
  (vii) Repeat step (iii) to step (vi) for 10 times.

Results show that with the modification of the capacitor electrode as shown in FIG. 12, the cells were able to be discharged and charged at higher rates compared with that arranged in FIG. 11. Three cells deliver no major differences in capacity, namely, in the range 175 to 180 mAh per gram (Table 3). This indicates that the carbon fibre nonwoven sheets, i.e., 8000030 (1-inch), 8000030 (0.5-inch) and 8000040 can be used as the electrically conductive and mechanical support for capacitor material.

TABLE 3

Test cells comprising different capacitor electrodes and its performance.

| Type | Carbon fibre nonwoven sheet[1] | Capacitor composition[2] | Capacity (mAh/gram of capacitor material) |
|---|---|---|---|
| 1 | 8000030 (1-inch) | Carbon black 0 wt % Activated carbon 85% | 180 |
| 2 | 8000030 (0.5-inch) | Carbon black 0 wt % Activated carbon 85% | 175 |
| 3 | 8000040 | Carbon black 0 wt % Activated carbon 85% | 175 |

6. Performance of High-Rate Electroactive Material with Lead Oxide

Experiments were also set up to test the effect of adding lead oxide to the high-rate electroactive material. This is to determine if the capacitor material can provide added energy, i.e., to be able to share energy with the high-energy electroactive material. The apparatus as per FIG. 12 was used in this experiment. The high-rate electroactive (capacitor) composition was changed to vary the lead oxide, carbon black and activated carbon. It was coated directly onto the lead sheet, or carbon fibre non woven sheet (8000030 or 8000040). The composition and cell configuration is given in Table 4. The experiment was set up to evaluate the different compositions and configurations under higher discharge current.

TABLE 4

Test cells comprising different capacitor electrodes and their performance.

| Cells | Configuration | Capacitor composition, wt %[1] | | Capacity (mAh per gram of capacitor material)[2] | |
|---|---|---|---|---|---|
| | | | | Discharge to 1.0 V | Discharge to 1.75 V |
| 1 | Capacitor material pasted directly onto the lead sheet | Lead oxide Carbon black Activated carbon | 20 20 45 | 38 | 9.7 |
| 2 | Capacitor material pasted directly onto the lead sheet | Lead oxide Carbon black Activated carbon | 20 30 35 | 66 | 15 |
| 3 | Capacitor material pasted onto 8000040 (from Hollingsworth and Vose) | Lead oxide Carbon black Activated carbon | 20 30 35 | 50 | 22 |
| 4 | Capacitor material pasted onto 8000030 (1 inch) (from Hollingsworth and Vose) | Lead oxide Carbon black Activated carbon | 20 30 35 | 53 | 11 |

Note:
[1]carboxymethyl cellulose 5 wt %, neoprene 10 wt %, 0 wt % plastic fibre
[2]discharge at 0.5 A, capacity taken on the 50th cycle The carbon fibre nonwoven sheets and pure lead metal sheets (thickness=about 1 mm) were cut to the shape with height of 75 mm and width of 75 mm, which is similar to that of the lead-acid positive electrode. The 4 cell types were coated with the lead oxide, carbon black and activate carbon compositions as listed above (Table 4) with the following: carboxylmethyl cellulose 5 wt % and neoprene 10 wt %. Cell 1 and 2 consisted of the high-rate carbon capacitor material pasted directly onto lead sheets (338) and then wrapped with a glass mat separator (340) and assembled with a positive lead-acid electrode (342) in a plastic container as shown in FIG. 12. Unlike the arrangement for Cells 1 and 2, Cell 3 and 4 had the high-rate carbon capacitor material pasted onto the 8000040 and 8000030 (1 inch) carbon fibre non woven sheets (334) respectively. These were then placed on top of the lead sheet (338) and then wrapped with a glass mat separator (340) and assembled with a positive lead-acid electrode (342) in a plastic container as shown in FIG. 12.

A 1.30 sg sulphuric acid solution was poured into the cell container to the level slightly higher than the upper positive electrode. After soaking the electrodes for 30 min, the cell was subjected to the following profile:
  (i) Charge the cell at a constant voltage (2.45 V) with a maximum current of 0.02 A for 1.5 h;
  (ii) Allow the cell to stand at open-circuit for 10 s;
  (iii) Discharge the cell at a current of 0.5 A until the cell voltage reaches a cut-off value of 1 V;
  (iv) Allow the cell to stand at open-circuit for 10 s;
  (v) Recharge the cell at a constant voltage of 2.45 V with a maximum current of 0.5 A until an overcharge of 10% is reached;
  (vi) Allow the cell to stand at open-circuit for 10 s;

(vii) Repeat step (iii) to step (vi) for 50 times.

(viii) Repeat step (ii) to step (vii) with the cut-off voltage of 1.75 V in step (iii)

Results show that with the addition of lead oxide into the capacitor electrode, the cells were able to be discharged at higher rates compared with cells that did not contain lead oxide. However, the capacities given in Table 4 with the cells discharged to 1.0 V are much lower compared to the capacities of a high activated carbon content capacitor (see Table 3). The capacity recorded at a discharge of 1.75 V is attributed to the lead oxide present in the capacitor.

The above cells were then subjected to another experiment to test their ability to accept higher currents. The cells were subjected to the following profile:

(i) Charge the cell at a constant voltage (2.65 V) with a maximum current of 0.02 A for 1.5 h;

(ii) Allow the cell to stand at open-circuit for 10 s;

(iii) Discharge the cell at a current of 0.5 A for 20 s;

(iv) Allow the cell to stand at open-circuit for 10 s;

(v) Recharge the cell at a constant voltage of 2.45 V with a maximum current of 70% of 0.5 A until a charge of 100% is reached by adjusting the time;

(vi) Allow the cell to stand at open-circuit for 10 s;

(ix) Repeat step (iii) to step (vi) until the cell voltage reaches a cut-off value of 1.75 V.

(x) Repeat step (ii) to step (vii) increasing the discharge current to 1 A. Increase the charging current to 1 A in step (v). Balance the charge going into the cell by adjusting the time during charging (ie. step (v)) so that the charge is equal to or greater than the discharge. If the discharge current causes the cell to reach the cut-off voltage then this is the maximum discharge current.

(xi) Repeat step (ii) to step (vii) increasing the discharge current and charge currents up to 2 A. Balance the charge going into the cell by adjusting the time during charging (ie. step (v)) so that the charge is equal to or greater than the discharge. If the discharge current can be increased beyond 2 A, then keep the charge current at 2 A and vary the time to enable the charge to match the discharge.

Figure 15:
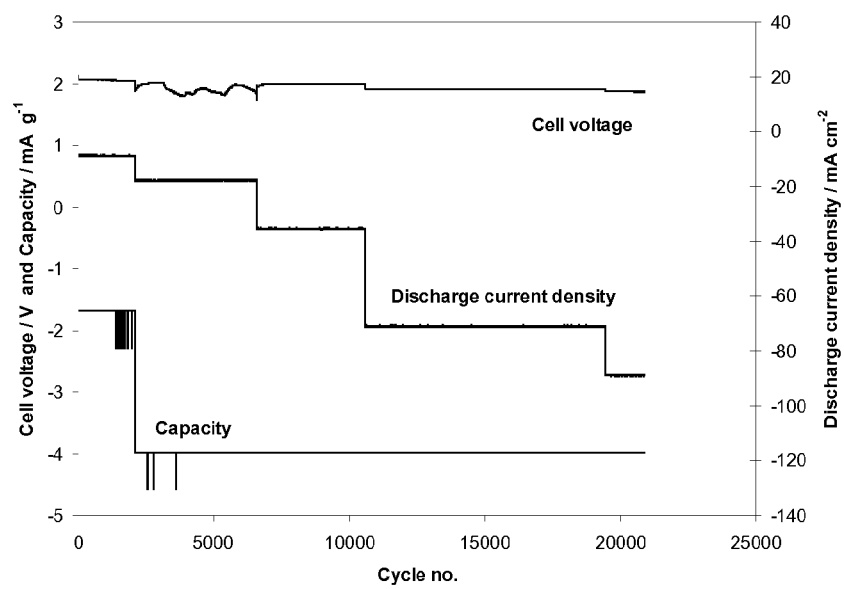
FIG. 15 is a graph showing the changes in cell voltage and capacity for a high current charge/discharge protocol for cell comprising a carbon fibre non-woven sheet 8000040 with a capacitor composition pasted thereon comprising 20 wt % lead oxide, 30 wt % carbon black and 35 wt % activated carbon.
Figure 16:
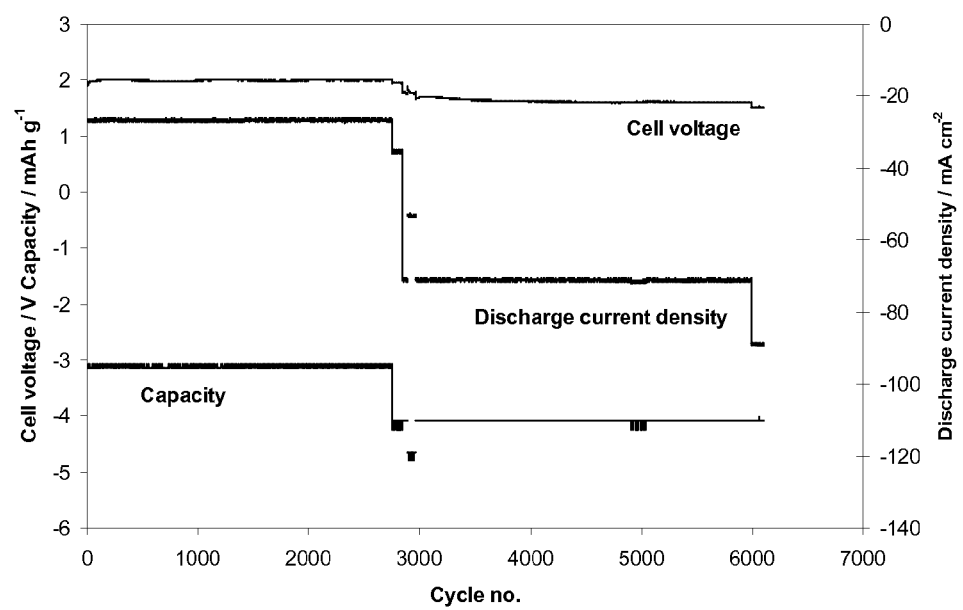
FIG. 16 is a graph showing the changes in cell voltage and capacity for a high current charge/discharge protocol for cell comprising a carbon fibre non-woven sheet 8000030 (1") with a capacitor composition pasted thereon comprising 20 wt % lead oxide, 30 wt % carbon black and 35 wt % activated carbon.

The results for Cell 1 is shown in FIG. 13, Cell 2 in FIG. 14, Cell 3 in FIG. 15 and Cell 4 in FIG. 16. The results for Cell 1 indicated that it was capable of maintaining a discharge current up to 0.5 A. Results for Cells 2, 3 and 4 showed that the discharge current can be increased up to 5 A (89 mA cm$^{-2}$) with a capacity up to 4 mAh g$^{-1}$.

7. Performance of a Valve Regulated Cell

Figure 17:
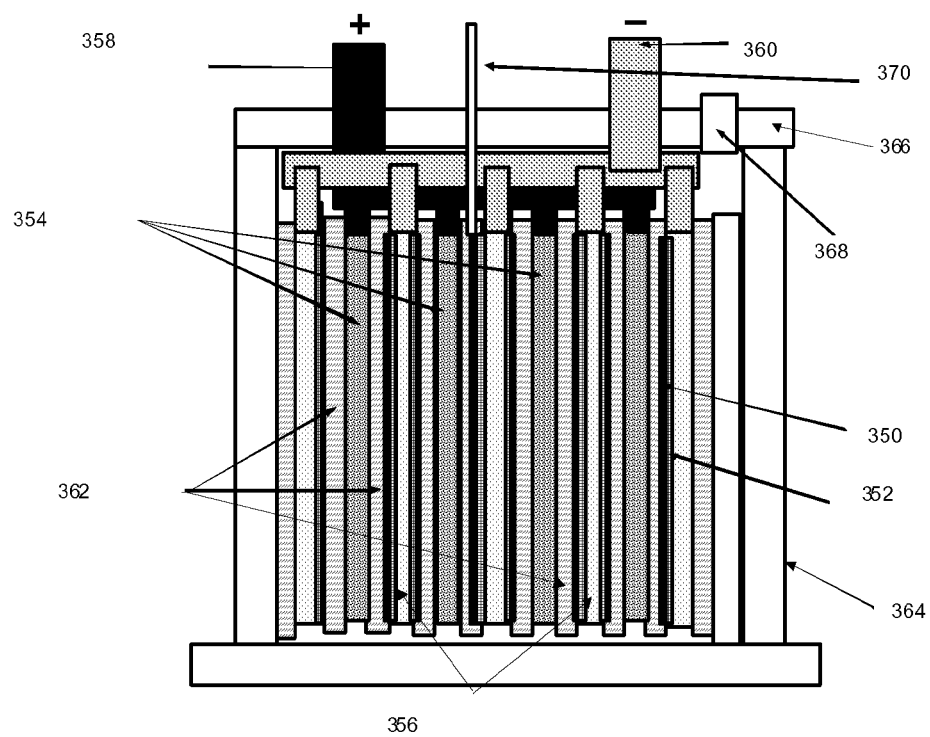
FIG. 17 shows a configuration of cell used to test the performance of a valve regulated lead acid (VRLA) 2 V cell containing carbon fibre non-woven sheets comprising capacitor material.

Experiments were also set up to determine the performance of a valve regulated lead acid (VRLA) 2 V cell containing an electrically conductive mat in the form of a carbon fibre non woven sheet comprising high-rate capacitor material. The apparatus as per FIG. 17 was used in this experiment.

The high-rate electroactive (capacitor) composition, consisted of activated carbon 86 wt %, carboxymethyl cellulose 4 wt %, and neoprene 10 wt % (350), was coated onto 8 pieces of 8000040 carbon fibre non woven sheets (352). These sheets were cut to the shape with height of 75 mm and width of 75 mm, which is similar to that of the lead-acid positive electrodes (354) and lead acid negative electrodes (356). The cell has 4 positive electrodes and 5 negative electrodes. The carbon fibre non woven sheets were then placed onto the negative electrodes so that the carbon fibre non woven sheet faced the negative electrode. Carbon fibre non woven sheets were only inserted next to the negative electrodes if the negative electrodes were facing a positive electrode. The positive electrodes were spot welded onto the positive current collector (358). The negative electrodes were spot welded onto the negative current collector (360). Glass mat separators (362) were inserted in between the carbon capacitor/carbon fibre non woven sheet and the positive electrode. The interleaved negative electrodes, carbon capacitor/carbon fibre non woven sheets, positive electrodes and glass mat separators were placed into an acrylic container (364) and compressed to 70 kPa. The container was sealed with an acrylic lid (366) fitted with a pressure valve (368). A silver/silver sulfate reference electrode (370) was inserted into the glass mat separator to record the positive potential.

A 1.30 sg sulfuric acid solution was poured into the cell container to the level slightly higher than the top of the glass mat separators. After soaking the cell for 8 hours, the cell was charged for 24 hours with a top of charge voltage of 2.55 V and 6 A. After charging, the acid was adjusted to 1.30 sg and the excess acid was removed from the cell. The cell was subjected to the following experiments 1) determination of 1 h capacity (C1)

2) determination of the cycling performance of the cell using the 42 V profile to simulate operating under mild hybrid driving conditions.

The 1 h capacity of the cell was determined using the following profile and was determined at every 10000 cycles completed during the 42 V profile cycling test:

(i) Charge the cell at a constant voltage (2.45 V) with a maximum current of 2.5 A for 1.5 h;

(ii) Discharge the cell at a current of 9.95 A until the cell voltage reaches a cut-off value of 1.67 V;

(iv) Recharge the cell at a constant voltage of 2.45 V with a maximum current of 9.95 A until a charge of 115% or 30 h is reached;

(v) Repeat from step (ii) 18 times (vi) Use Peukert's Equation to determine the 1 h capacity.

The initial capacity of the cell was determined to be 9.22 Ah. Therefore the C1 rate was 9.22 A and this value was used in the 42 V cycling test.

Figure 18:
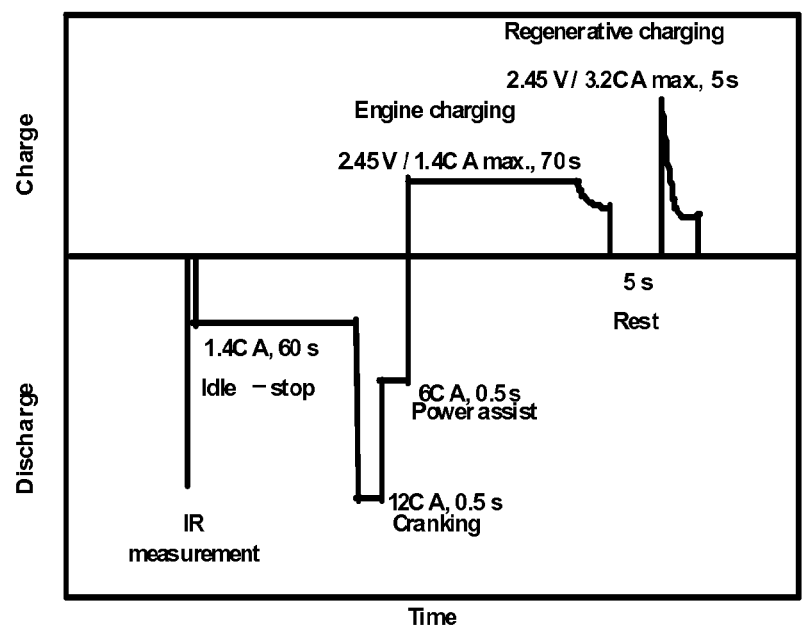
FIG. 18 is a graph showing a 42 V charging and discharging cycling profile for testing the performance of the cell of FIG. 17.

The next experiment studied the performance of the cell under a 42 V cycling profile, given in FIG. 18. This profile included the following steps with the C1=9.4 A:

(i) Internal resistance (iR) measurement
   Current pulse of −12 A for 100 ms;

(ii) Idling stop operation
   Discharge with 1.4C1 for 60 s, If the cell voltage reaches the cut off voltage (CoV) 1.2 V, then end cycling;

(iii) Cranking operation
   Discharge with 12C1 for 0.5 s, CoV<1.2 V then end cycling (iv) Power assist operation
   Discharge with 6C1 for 0.5 s, CoV<1.2 V then end cycling (v) Engine charge operation
   Charge with 1.4C1, for 70 s, or ToCV (Top of Charge Voltage) 2.45 V
   0 current for 5 s
   Charge with 3.2C1 for 5 s, or ToCV=2.45 V (vi) Repeat from step (i) until 10 000 cycles is reached (vii) Residual capacity test
   Discharge with C1, CoV<1.67 V (viii) Full charge for 24 h and 1 h capacity test
   Charge with 0.5C1 for 24 h with a ToCV=2.45 V
   Discharge with C1 until CoV<1.67 V (ix) Full charge for 24 h—end of the profile
   Charge with 0.5C1 for 24 h or charge/discharge capacity=115%

(x) Start next 10 000 cycles testing until CoV<1.2 V.

Figure 19:
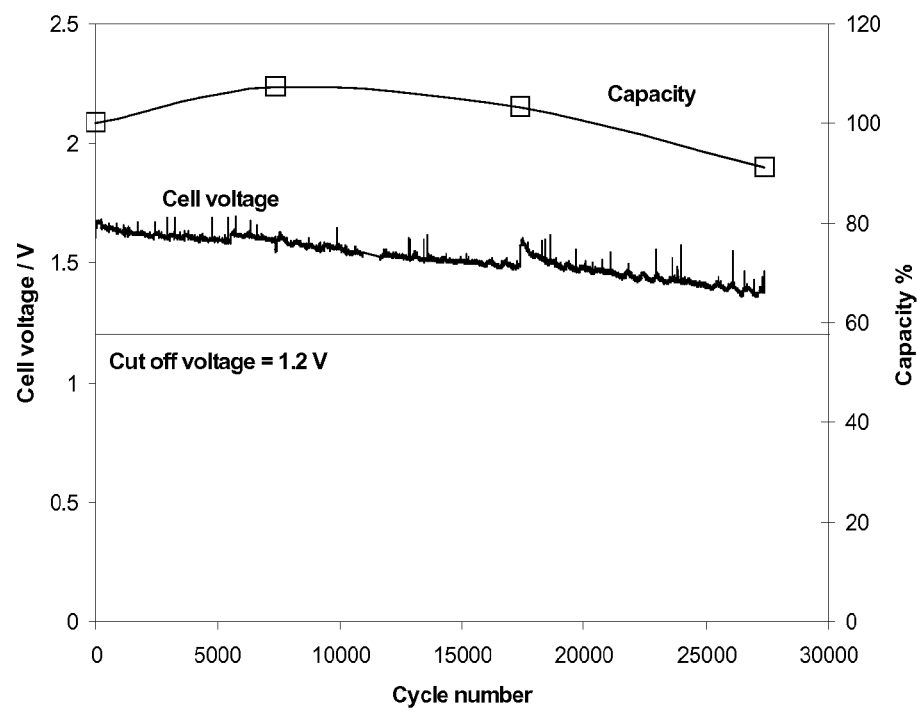
FIG. 19 is a graph showing the changes in cell voltage and capacity for testing of the cell as per FIG. 17.

The results of the 42 V cycling are shown in FIG. 19. The capacity was determined at every 10000 cycles completed during the 42 V profile cycling test. The graph showed that the cell had not yet reached the cut off voltage of 1.2 V, ie it had not yet failed after 27389 cycles. The capacity of the cell was taken at every 10000 cycles. The capacity increased slightly during the first 7389 cycles (the cell had stopped cycling at this point due to a power failure) and was gradually decreasing the longer the cell had been cycled.

8. Manufacture of Composite Layer and Electrode Embodiments

Figure 20:
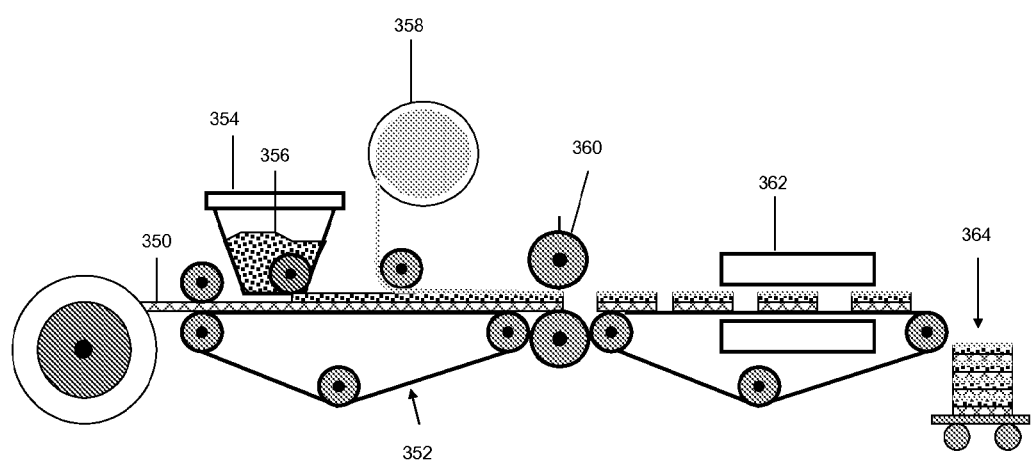
FIG. 20 shows an apparatus and process according to an embodiment of the invention for fabricating a composite layer comprising an electrically conductive mat coated with a high-rate electroactive material.
Figure 21:
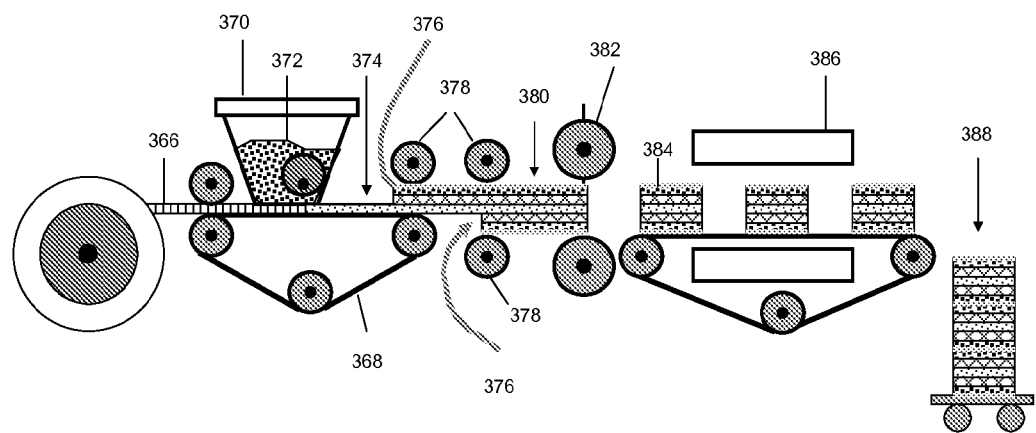
FIG. 21 shows an apparatus and process according to an embodiment of the invention for fabricating a double sided electrode with a composite layer applied to each side thereof.

Examples of two manufacturing processes involving a capacitor composite layer i.e. a composite layer comprising the high-rate (capacitor) electroactive material coated onto the electrically conductive mat, which is in the form of a carbon fibre nonwoven sheet, are shown in FIGS. 20 and 21.

FIG. 20 shows a process to produce a capacitor composite layer or sheet, which can be stored and used later with negative and positive lead-acid plates, together with a separator during battery assembly. One negative lead-acid plate can be assembled with two capacitor composite sheets placed onto both sides of the negative lead-acid plate (FIG. 21).

In FIG. 20 a strip of carbon fibre nonwoven material (350) is fed by the convey belt (352) to the paster or hopper (354), where the capacitor paste (356) comprising high rate electroactive material is applied onto the strip. A paper strip (358) is then placed onto the surface of the capacitor composite strip to facilitate handling and the composite layer is cut into plates by a rotating cutter (360) to plate shape having a given length. The capacitor composite plates are then fed through a flash drier (362), where the surface moisture of the capacitor composite plate is removed. The capacitor composite plates are stacked and subsequently transported to the drying oven.

FIG. 21 shows the simultaneous application of two (high-rate) capacitor composite layers over an electrode layer comprising a current collector coated with a high-energy electroactive material. The negative lead-acid high-energy (battery) paste (372) is applied by the paster (370) onto the current collector to form an electrode layer, which is in the form of a continuous cast lead-alloy grid (366) and is fed into the pasting machine by the convey belt (368). The two capacitor composite layers (376), which have been previously formed, are pressed onto both sides of the electrode layer (374) with continuous pasting by pair rollers (378) to form a composite electrode component. The pasting of the two capacitor composite layers can be performed at the same time with the add-on paste mixer and pasters. The whole composite electrode component (380) is then cut by the rotating cutter (382) to plate shape with a given length (384). The composite plates (384) are then transported through the flash drier (386) where the surface moisture of the composite plates is removed. The composite plates are stacked (388) and subsequently transported to the curing and drying process stages.

The invention claimed is:

1. An electrode for an electrical storage device comprising:
a current collector in the form of a current collector grid or plate;
a first electroactive material in a form of a first electroactive material layer;
a second electroactive material in a form of a second electroactive material layer; and
an electrically conductive mat comprising a porous network of interconnected electrically conductive fibres, forming an electrically conductive mat layer;
wherein:
the first electroactive material is deposited upon a planar side of the current collector grid or plate, the electrically conductive mat is layered upon the first electroactive material, and the second electroactive material is layered upon the electrically conductive mat;
the first electroactive material has a higher energy density than the second electroactive material, and the second electroactive material has a higher rate capability than the first electroactive material; and
the electrically conductive mat provides structural and conductive support for at least one of the first electroactive material and the second electroactive material.

2. The electrode according to claim 1, wherein the electrically conductive mat is a carbon fibre sheet.

3. The electrode according to claim 1, wherein the electrically conductive mat is provided as an intervening layer separating the first electroactive material from the second electroactive material.

4. The electrode according to claim 1, wherein the first electroactive material is a lead based material.

5. The electrode according to claim 1, wherein the second electroactive material is selected from one or more of the group consisting of high-surface area carbon, ruthenium oxide, silver oxide, cobalt oxide and conducting polymers.

6. The electrode according to claim 5, wherein the high surface area carbon is one or more materials selected from the group consisting of activated carbon, carbon black, amorphous carbon, carbon nanoparticles, carbon nanotubes and carbon fibres.

7. The electrode according to claim 6, wherein the high surface area carbon is activated carbon.

8. An electrical storage device comprising at least one pair of negative and positive electrodes, wherein at least one electrode is an electrode according to claim 1.

9. The electrical storage device according to claim 8, wherein the at least one electrode is a negative electrode comprising a first electroactive material selected from one or more of the group consisting of cadmium, metal hydrides, lead and zinc.

10. The electrical storage device according to claim 9, wherein the first electroactive material is lead.

11. The electrical storage device according to claim 8, wherein the at least one electrode is a positive electrode comprising a first electroactive material selected from one or more of the group consisting of nickel oxide, lead oxide and silver.

12. The electrical storage device according to claim 11, wherein the first electroactive material is lead oxide.

13. The electrical storage device according to claim 8, wherein the device is a valve regulated device.

14. The electrical storage device according to claim 8, wherein the electrical storage device is configured for operation under a compression force of less than about 80 kPa.

15. An electrical storage device comprising at least one lead dioxide based positive electrode and at least one sponge lead based negative electrode in a sulphuric acid electrolyte solution, wherein the at least one sponge lead based negative electrode comprises:
a current collector in the form of a current collector grid or plate;
a first layer deposited on a planar side of the current collector grid or plate, the first layer comprising sponge lead;
a second layer layered upon the first layer, the second layer comprising an electrically conductive mat comprising a network of interconnected electrically conductive carbon fibres;
a third layer layered upon the second layer, the third layer comprising a second electroactive material;

wherein the sponge lead has a higher energy density than the second electroactive material, and the second electroactive material has a higher rate capability than the sponge lead.

16. A process for fabricating an electrode according to claim 1, the process comprising:
   forming a composite layer comprising at least one of the first electroactive material and the second electroactive material deposited on and/or incorporated within the electrically conductive mat; and
   coupling the composite layer to the current collector.

17. A process for fabricating an electrode according to claim 16, wherein the process further comprises forming a coating of the first electroactive material on the current collector, and coupling the composite layer to the coating of the first electroactive material on the current collector.

18. The electrode according to claim 1, wherein one of the first electroactive material layer and the second electroactive material layer is in the form of a composite layer with the electrically conductive mat.

19. The electrode according to claim 1, wherein the first electroactive material layer forms a first layer layered upon the current collector, the electrically conductive mat layer forms a second layer layered upon the first layer, and the second electroactive material forms a third layer layered upon the second layer.

* * * * *